(12) United States Patent
Stepanov et al.

(10) Patent No.: US 11,736,615 B2
(45) Date of Patent: Aug. 22, 2023

(54) METHOD, APPARATUS, AND COMPUTER-READABLE MEDIUM FOR MANAGING CONCURRENT COMMUNICATIONS IN A NETWORKED CALL CENTER

(71) Applicant: Talkdesk, Inc., San Francisco, CA (US)

(72) Inventors: Gennadiy Stepanov, Hallandale Beach, FL (US); Filipe Valeriano, Coimbra (PT); Paulo Lapa, Entroncamento (PT); Hemerson Tacon, Coimbra (PT)

(73) Assignee: Talkdesk, Inc., San Francisco, CA (US)

( * ) Notice: Subject to any disclaimer, the term of this patent is extended or adjusted under 35 U.S.C. 154(b) by 0 days.

(21) Appl. No.: 17/314,783

(22) Filed: May 7, 2021

(65) Prior Publication Data

US 2021/0266405 A1 Aug. 26, 2021

Related U.S. Application Data

(63) Continuation-in-part of application No. 16/744,397, filed on Jan. 16, 2020, now abandoned.

(51) Int. Cl.
*H04M 3/00* (2006.01)
*H04M 3/523* (2006.01)
(Continued)

(52) U.S. Cl.
CPC ............ *H04M 3/5233* (2013.01); *G06F 17/11* (2013.01); *G06Q 10/063112* (2013.01);
(Continued)

(58) Field of Classification Search
CPC ................. H04M 3/5233; G06F 17/11; G06Q 10/063112
(Continued)

(56) References Cited

U.S. PATENT DOCUMENTS 5,862,203 A 1/1999 Wulkan et al.
5,897,616 A 4/1999 Kanevsky et al.
(Continued)

FOREIGN PATENT DOCUMENTS

EP 1 418 519 A1 5/2004
JP 5986065 B2 9/2016
(Continued)

OTHER PUBLICATIONS

Gaietto, Molly., "What is Customer DNA?",—NGDATA Product News, Oct. 27, 2015, 10 pages.
(Continued)

*Primary Examiner* — William J Deane, Jr.
(74) *Attorney, Agent, or Firm* — Rimon PC; Marc S. Kaufman

(57) ABSTRACT

A method and apparatus for scheduling agents in a call center to meet predefined service levels, wherein communications are associated with queues representing categories of communications, the queues including at least one concurrent queue of concurrent communications, wherein multiple concurrent communications can be handled concurrently by a single agent. The method includes executing a simulation to determine an effectiveness of plural agents. The simulation includes computing a skill group weighting (SGW) for each agent for at least one concurrent queue and at least one interval based on:
$t_c$, the time spent by the agent on queue C communications
$t_{all}$, the time spent by the agent on all concurrent communications
$t_e$, the elapsed concurrent time for the agent
$t_n$, the non-idle time of the agent; and
Agents are scheduled based on the SGW and max capacity of concurrent communications for each agent.

21 Claims, 8 Drawing Sheets

(51) Int. Cl.
*H04M 3/51* (2006.01)
*G06F 17/11* (2006.01)
*G06Q 10/0631* (2023.01)

(52) U.S. Cl.
CPC .. *G06Q 10/063114* (2013.01); *H04M 3/5175* (2013.01); *H04M 3/5183* (2013.01); *H04M 3/5238* (2013.01)

(58) Field of Classification Search
USPC ....... 379/266.01–266.1, 265.01–265.14, 309
See application file for complete search history.

(56) References Cited

U.S. PATENT DOCUMENTS

| | | |
|---|---|---|
| 5,966,691 A | 10/1999 | Kibre et al. |
| 5,970,124 A | 10/1999 | Csaszar et al. |
| 6,100,891 A | 8/2000 | Thorne |
| 6,128,415 A | 10/2000 | Hultgren et al. |
| 6,163,607 A | 12/2000 | Bogart et al. |
| 6,230,197 B1 | 5/2001 | Beck et al. |
| 6,263,057 B1 | 7/2001 | Silverman |
| 6,345,093 B1 | 2/2002 | Lee et al. |
| 6,385,584 B1 | 5/2002 | McAllister et al. |
| 6,411,687 B1 | 6/2002 | Bohacek et al. |
| 6,493,695 B1 | 12/2002 | Pickering et al. |
| 6,560,222 B1 | 5/2003 | Pounds et al. |
| 6,587,831 B1 | 7/2003 | O'Brien |
| 6,639,982 B1 | 10/2003 | Stuart et al. |
| 6,721,416 B1 | 4/2004 | Farrell |
| 6,754,333 B1 | 6/2004 | Flockhart et al. |
| 6,859,776 B1 | 2/2005 | Cohen et al. |
| 6,970,829 B1 | 11/2005 | Leamon |
| 7,023,979 B1 | 4/2006 | Wu et al. |
| 7,076,047 B1 | 7/2006 | Brennan et al. |
| 7,110,525 B1 | 9/2006 | Heller et al. |
| 7,209,475 B1 | 4/2007 | Shaffer et al. |
| 7,274,787 B1 | 9/2007 | Schoeneberger |
| 7,292,689 B2 | 11/2007 | Odinak et al. |
| 7,343,406 B1 | 3/2008 | Buonanno et al. |
| 7,372,952 B1 | 5/2008 | Wu et al. |
| 7,382,773 B2 | 6/2008 | Schoeneberger et al. |
| 7,409,336 B2 | 8/2008 | Pak et al. |
| 7,426,268 B2 | 9/2008 | Walker et al. |
| 7,466,334 B1 | 12/2008 | Baba |
| 7,537,154 B2 | 5/2009 | Ramachandran |
| 7,634,422 B1 | 12/2009 | Andre et al. |
| 7,657,263 B1 | 2/2010 | Chahrouri |
| 7,672,746 B1 | 3/2010 | Hamilton et al. |
| 7,672,845 B2 | 3/2010 | Beranek et al. |
| 7,676,034 B1 | 3/2010 | Wu et al. |
| 7,698,163 B2 | 4/2010 | Reed et al. |
| 7,752,159 B2 | 7/2010 | Nelken et al. |
| 7,774,790 B1 | 8/2010 | Jirman et al. |
| 7,788,286 B2 | 8/2010 | Nourbakhsh et al. |
| 7,853,006 B1 | 12/2010 | Fama et al. |
| 7,864,946 B1 | 1/2011 | Fama et al. |
| 7,869,998 B1 | 1/2011 | Di Fabbrizio et al. |
| 7,949,123 B1 | 5/2011 | Flockhart et al. |
| 7,953,219 B2 | 5/2011 | Freedman et al. |
| 7,966,369 B1 | 6/2011 | Briere et al. |
| 8,060,394 B2 | 11/2011 | Woodings et al. |
| 8,073,129 B1 | 12/2011 | Kalavar |
| 8,116,446 B1 | 2/2012 | Kalavar |
| 8,135,125 B2 | 3/2012 | Sidhu et al. |
| 8,160,233 B2 | 4/2012 | Keren et al. |
| 8,184,782 B1 | 5/2012 | Vatland et al. |
| 8,223,951 B1 | 7/2012 | Edelhaus et al. |
| 8,229,761 B2 | 7/2012 | Backhaus et al. |
| 8,243,896 B1 | 8/2012 | Rae |
| 8,300,798 B1 | 10/2012 | Wu et al. |
| 8,369,338 B1 | 2/2013 | Peng et al. |
| 8,370,155 B2 | 2/2013 | Byrd et al. |
| 8,391,466 B1 | 3/2013 | Noble, Jr. |
| 8,447,279 B1 | 5/2013 | Peng et al. |
| 8,488,769 B1 | 7/2013 | Noble et al. |
| 8,526,576 B1 | 9/2013 | Deich et al. |
| 8,583,466 B2 | 11/2013 | Margulies et al. |
| 8,594,306 B2 | 11/2013 | Laredo et al. |
| 8,626,137 B1 | 1/2014 | Devitt et al. |
| 8,635,226 B2 | 1/2014 | Chang et al. |
| 8,644,489 B1 | 2/2014 | Noble et al. |
| 8,671,020 B1 | 3/2014 | Morrison et al. |
| 8,688,557 B2 | 4/2014 | Rose et al. |
| 8,738,739 B2 | 5/2014 | Makar et al. |
| 8,767,948 B1 | 7/2014 | Riahi et al. |
| 8,811,597 B1 | 8/2014 | Hackbarth et al. |
| 8,861,691 B1 | 10/2014 | De et al. |
| 8,869,245 B2 | 10/2014 | Ranganathan et al. |
| 8,898,219 B2 | 11/2014 | Ricci |
| 8,898,290 B2 | 11/2014 | Siemsgluess |
| 8,909,693 B2 | 12/2014 | Frissora et al. |
| 8,935,172 B1 | 1/2015 | Noble, Jr. et al. |
| 8,996,509 B1 | 3/2015 | Sundaram |
| 9,020,142 B2 | 4/2015 | Kosiba et al. |
| 9,026,431 B1 | 5/2015 | Moreno Mengibar et al. |
| 9,060,057 B1 | 6/2015 | Danis |
| 9,065,915 B1 | 6/2015 | Lillard et al. |
| 9,082,094 B1 | 7/2015 | Etter et al. |
| 9,100,483 B1 | 8/2015 | Snedden |
| 9,117,450 B2 | 8/2015 | Cook et al. |
| 9,123,009 B1 | 9/2015 | Etter et al. |
| 9,137,366 B2 | 9/2015 | Medina et al. |
| 9,152,737 B1 | 10/2015 | Micali et al. |
| 9,160,853 B1 | 10/2015 | Daddi et al. |
| 9,178,999 B1 | 11/2015 | Hedge et al. |
| 9,185,222 B1 | 11/2015 | Govindarajan et al. |
| 9,237,232 B1 | 1/2016 | Williams et al. |
| 9,280,754 B1 | 3/2016 | Schwartz et al. |
| 9,286,413 B1 | 3/2016 | Coates et al. |
| 9,300,801 B1 | 3/2016 | Warford et al. |
| 9,319,524 B1 | 4/2016 | Webster |
| 9,386,152 B2 | 7/2016 | Riahi et al. |
| 9,397,985 B1 | 7/2016 | Seger et al. |
| 9,426,291 B1 | 8/2016 | Ouimette et al. |
| 9,473,637 B1 | 10/2016 | Venkatapathy et al. |
| 9,514,463 B2 | 12/2016 | Grigg et al. |
| 9,595,049 B2 | 3/2017 | Showers et al. |
| 9,609,131 B2 | 3/2017 | Placiakis et al. |
| 9,674,361 B2 | 6/2017 | Ristock et al. |
| 9,679,265 B1 | 6/2017 | Schwartz et al. |
| 9,774,731 B1 | 9/2017 | Haltom et al. |
| 9,787,840 B1 | 10/2017 | Neuer, III et al. |
| 9,813,495 B1 | 11/2017 | Van et al. |
| 9,823,949 B2 | 11/2017 | Ristock et al. |
| 9,883,037 B1 | 1/2018 | Lewis et al. |
| 9,894,478 B1 | 2/2018 | Deluca et al. |
| 9,930,181 B1 | 3/2018 | Moran et al. |
| 9,955,021 B1 | 4/2018 | Liu et al. |
| RE46,852 E | 5/2018 | Petrovykh |
| 9,998,596 B1 | 6/2018 | Dunmire et al. |
| 10,009,465 B1 | 6/2018 | Fang et al. |
| 10,038,788 B1 | 7/2018 | Khalatian |
| 10,044,862 B1 | 8/2018 | Cai et al. |
| 10,079,939 B1 | 9/2018 | Bostick et al. |
| 10,085,073 B2 | 9/2018 | Ray et al. |
| 10,101,974 B2 | 10/2018 | Ristock et al. |
| 10,115,065 B1 | 10/2018 | Fama et al. |
| 10,135,973 B2 | 11/2018 | Algard et al. |
| 10,154,138 B2 | 12/2018 | Te Booij et al. |
| 10,194,027 B1 | 1/2019 | Daddi et al. |
| 10,235,999 B1 | 3/2019 | Naughton et al. |
| 10,241,752 B2 | 3/2019 | Lemay et al. |
| 10,242,019 B1 | 3/2019 | Shan et al. |
| 10,276,170 B2 | 4/2019 | Gruber et al. |
| 10,277,745 B1 | 4/2019 | Araujo et al. |
| 10,290,017 B2 | 5/2019 | Traasdahl et al. |
| 10,331,402 B1 | 6/2019 | Spector et al. |
| 10,380,246 B2 | 8/2019 | Clark et al. |
| 10,440,180 B1 | 10/2019 | Jayapalan et al. |
| 10,445,742 B2 | 10/2019 | Prendki et al. |
| 10,460,728 B2 | 10/2019 | Anbazhagan et al. |
| 10,497,361 B1 | 12/2019 | Rule et al. |
| 10,554,590 B2 | 2/2020 | Cabrera-Cordon et al. |

(56) References Cited

U.S. PATENT DOCUMENTS

| | | |
|---|---|---|
| 10,554,817 B1 | 2/2020 | Sullivan et al. |
| 10,572,879 B1 | 2/2020 | Hunter et al. |
| 10,574,822 B1 | 2/2020 | Sheshaiahgari et al. |
| 10,601,992 B2 | 3/2020 | Dwyer et al. |
| 10,623,572 B1 | 4/2020 | Copeland |
| 10,635,973 B1 | 4/2020 | Dirac et al. |
| 10,636,425 B2 | 4/2020 | Naughton et al. |
| 10,699,303 B2 | 6/2020 | Ismail et al. |
| 10,715,648 B1 | 7/2020 | Vashisht et al. |
| 10,718,031 B1 | 7/2020 | Wu et al. |
| 10,728,384 B1 | 7/2020 | Channakeshava et al. |
| 10,735,586 B1 | 8/2020 | Johnston |
| 10,742,806 B2 | 8/2020 | Kotak |
| 10,750,019 B1 | 8/2020 | Petrovykh et al. |
| 10,783,568 B1 | 9/2020 | Chandra et al. |
| 10,789,956 B1 | 9/2020 | Dube |
| 10,803,865 B2 | 10/2020 | Naughton et al. |
| 10,812,654 B2 | 10/2020 | Wozniak |
| 10,812,655 B1 | 10/2020 | Adibi et al. |
| 10,827,069 B1 | 11/2020 | Paiva |
| 10,827,071 B1 | 11/2020 | Adibi et al. |
| 10,839,432 B1 | 11/2020 | Konig et al. |
| 10,841,425 B1 | 11/2020 | Langley et al. |
| 10,855,844 B1 | 12/2020 | Smith et al. |
| 10,861,031 B2 | 12/2020 | Sullivan et al. |
| 10,878,479 B2 | 12/2020 | Wu et al. |
| 10,929,796 B1 * | 2/2021 | Stepanov ............ G06Q 10/1097 |
| 10,943,589 B2 | 3/2021 | Naughton et al. |
| 10,970,682 B1 | 4/2021 | Aykin |
| 11,017,176 B2 | 5/2021 | Ayers et al. |
| 11,089,158 B1 | 8/2021 | Holland et al. |
| 2001/0008999 A1 | 7/2001 | Bull |
| 2001/0024497 A1 | 9/2001 | Campbell |
| 2001/0054072 A1 | 12/2001 | Discolo et al. |
| 2002/0019737 A1 | 2/2002 | Stuart et al. |
| 2002/0029272 A1 | 3/2002 | Weller |
| 2002/0034304 A1 | 3/2002 | Yang |
| 2002/0038420 A1 | 3/2002 | Collins et al. |
| 2002/0067823 A1 | 6/2002 | Walker et al. |
| 2002/0143599 A1 * | 10/2002 | Nourbakhsh .... G06Q 10/06375 |
| | | 705/321 |
| 2002/0169664 A1 | 11/2002 | Walker et al. |
| 2002/0174182 A1 | 11/2002 | Wilkinson et al. |
| 2002/0181689 A1 | 12/2002 | Rupe et al. |
| 2003/0007621 A1 | 1/2003 | Graves et al. |
| 2003/0009520 A1 * | 1/2003 | Nourbakhsh ....... H04M 3/5233 |
| | | 709/204 |
| 2003/0032409 A1 | 2/2003 | Hutcheson et al. |
| 2003/0061068 A1 | 3/2003 | Curtis |
| 2003/0112927 A1 | 6/2003 | Brown et al. |
| 2003/0126136 A1 | 7/2003 | Omoigui |
| 2003/0167167 A1 | 9/2003 | Gong |
| 2004/0044585 A1 | 3/2004 | Franco |
| 2004/0044664 A1 | 3/2004 | Cash et al. |
| 2004/0062364 A1 | 4/2004 | Dezonno et al. |
| 2004/0078257 A1 | 4/2004 | Schweitzer et al. |
| 2004/0098274 A1 | 5/2004 | Dezonno et al. |
| 2004/0103051 A1 | 5/2004 | Reed et al. |
| 2004/0141508 A1 | 7/2004 | Schoeneberger et al. |
| 2004/0162724 A1 | 8/2004 | Hill et al. |
| 2004/0162753 A1 | 8/2004 | Vogel et al. |
| 2004/0174980 A1 | 9/2004 | Knott et al. |
| 2004/0215451 A1 | 10/2004 | Macleod |
| 2005/0033957 A1 | 2/2005 | Enokida |
| 2005/0043986 A1 | 2/2005 | Mcconnell et al. |
| 2005/0063365 A1 | 3/2005 | Mathew et al. |
| 2005/0071178 A1 | 3/2005 | Beckstrom et al. |
| 2005/0105712 A1 | 5/2005 | Williams et al. |
| 2005/0177368 A1 | 8/2005 | Odinak et al. |
| 2005/0226220 A1 | 10/2005 | Kilkki et al. |
| 2005/0228774 A1 | 10/2005 | Ronnewinkel |
| 2005/0246511 A1 | 11/2005 | Willman et al. |
| 2005/0271198 A1 | 12/2005 | Chin et al. |
| 2006/0095575 A1 | 5/2006 | Sureka et al. |
| 2006/0126818 A1 | 6/2006 | Berger et al. |
| 2006/0153357 A1 | 7/2006 | Acharya et al. |
| 2006/0166669 A1 | 7/2006 | Claussen |
| 2006/0188086 A1 | 8/2006 | Busey et al. |
| 2006/0209797 A1 | 9/2006 | Anisimov et al. |
| 2006/0215831 A1 | 9/2006 | Knott et al. |
| 2006/0229931 A1 | 10/2006 | Fligler et al. |
| 2006/0256953 A1 | 11/2006 | Pulaski et al. |
| 2006/0271361 A1 | 11/2006 | Vora et al. |
| 2006/0274856 A1 | 12/2006 | Dun et al. |
| 2006/0277108 A1 | 12/2006 | Altberg et al. |
| 2007/0016565 A1 | 1/2007 | Evans et al. |
| 2007/0036334 A1 | 2/2007 | Culbertson et al. |
| 2007/0038499 A1 | 2/2007 | Margulies et al. |
| 2007/0041519 A1 | 2/2007 | Erhart et al. |
| 2007/0061183 A1 * | 3/2007 | Seetharaman ......... G06Q 10/06 |
| | | 705/7.13 |
| 2007/0078725 A1 | 4/2007 | Koszewski et al. |
| 2007/0121902 A1 | 5/2007 | Stoica et al. |
| 2007/0121903 A1 | 5/2007 | Moore, Jr. et al. |
| 2007/0136284 A1 | 6/2007 | Cobb et al. |
| 2007/0155411 A1 | 7/2007 | Morrison |
| 2007/0157021 A1 | 7/2007 | Whitfield |
| 2007/0160188 A1 | 7/2007 | Sharpe et al. |
| 2007/0162296 A1 | 7/2007 | Altberg et al. |
| 2007/0198329 A1 | 8/2007 | Lyerly et al. |
| 2007/0201636 A1 | 8/2007 | Gilbert et al. |
| 2007/0263810 A1 | 11/2007 | Sterns |
| 2007/0265990 A1 | 11/2007 | Sidhu et al. |
| 2007/0269031 A1 | 11/2007 | Honig et al. |
| 2007/0280460 A1 | 12/2007 | Harris et al. |
| 2007/0287430 A1 | 12/2007 | Hosain et al. |
| 2008/0002823 A1 | 1/2008 | Fama et al. |
| 2008/0004933 A1 * | 1/2008 | Gillespie ................ G06Q 10/06 |
| | | 705/7.14 |
| 2008/0043976 A1 | 2/2008 | Maximo et al. |
| 2008/0065902 A1 | 3/2008 | Spohrer et al. |
| 2008/0095355 A1 | 4/2008 | Mahalaha et al. |
| 2008/0126957 A1 | 5/2008 | Tysowski et al. |
| 2008/0205620 A1 | 8/2008 | Odinak et al. |
| 2008/0225872 A1 | 9/2008 | Collins et al. |
| 2008/0254774 A1 | 10/2008 | Lee |
| 2008/0255944 A1 | 10/2008 | Shah et al. |
| 2008/0260138 A1 | 10/2008 | Chen et al. |
| 2008/0288770 A1 | 11/2008 | Kline et al. |
| 2008/0300955 A1 | 12/2008 | Hamilton et al. |
| 2009/0018996 A1 | 1/2009 | Hunt et al. |
| 2009/0080411 A1 | 3/2009 | Lyman |
| 2009/0086945 A1 | 4/2009 | Buchanan et al. |
| 2009/0086949 A1 | 4/2009 | Caspi et al. |
| 2009/0086953 A1 | 4/2009 | Vendrow |
| 2009/0110182 A1 | 4/2009 | Knight, Jr. et al. |
| 2009/0171164 A1 | 7/2009 | Jung et al. |
| 2009/0222551 A1 | 9/2009 | Neely et al. |
| 2009/0228264 A1 | 9/2009 | Williams et al. |
| 2009/0234710 A1 | 9/2009 | Belgaied et al. |
| 2009/0234732 A1 | 9/2009 | Zorman et al. |
| 2009/0245479 A1 | 10/2009 | Surendran |
| 2009/0285384 A1 | 11/2009 | Pollock et al. |
| 2009/0306981 A1 | 12/2009 | Cromack et al. |
| 2009/0307052 A1 | 12/2009 | Mankani et al. |
| 2010/0106568 A1 | 4/2010 | Grimes |
| 2010/0114646 A1 | 5/2010 | McIlwain et al. |
| 2010/0189250 A1 | 7/2010 | Williams et al. |
| 2010/0211515 A1 | 8/2010 | Woodings et al. |
| 2010/0235341 A1 | 9/2010 | Bennett |
| 2010/0250196 A1 | 9/2010 | Lawler et al. |
| 2010/0262549 A1 | 10/2010 | Kannan et al. |
| 2010/0266115 A1 | 10/2010 | Fedorov et al. |
| 2010/0266116 A1 | 10/2010 | Stolyar et al. |
| 2010/0274618 A1 | 10/2010 | Byrd et al. |
| 2010/0287131 A1 | 11/2010 | Church |
| 2010/0293033 A1 | 11/2010 | Hall et al. |
| 2010/0299268 A1 | 11/2010 | Guha et al. |
| 2010/0332287 A1 | 12/2010 | Gates et al. |
| 2011/0014932 A1 | 1/2011 | Estevez |
| 2011/0022461 A1 | 1/2011 | Simeonov |
| 2011/0071870 A1 | 3/2011 | Gong |
| 2011/0077994 A1 | 3/2011 | Segev et al. |
| 2011/0082688 A1 | 4/2011 | Kim et al. |

(56) References Cited

U.S. PATENT DOCUMENTS

| | | |
|---|---|---|
| 2011/0116618 A1 | 5/2011 | Zyarko et al. |
| 2011/0125697 A1 | 5/2011 | Erhart et al. |
| 2011/0143323 A1 | 6/2011 | Cohen |
| 2011/0182283 A1 | 7/2011 | Van et al. |
| 2011/0185293 A1 | 7/2011 | Barnett et al. |
| 2011/0216897 A1 | 9/2011 | Laredo et al. |
| 2011/0264581 A1 | 10/2011 | Clyne |
| 2011/0267985 A1 | 11/2011 | Wilkinson et al. |
| 2011/0286592 A1 | 11/2011 | Nimmagadda |
| 2011/0288897 A1 | 11/2011 | Erhart et al. |
| 2012/0046996 A1 | 2/2012 | Shah et al. |
| 2012/0051537 A1 | 3/2012 | Chishti et al. |
| 2012/0084217 A1 | 4/2012 | Kohler et al. |
| 2012/0087486 A1 | 4/2012 | Guerrero et al. |
| 2012/0095835 A1 | 4/2012 | Makar et al. |
| 2012/0109830 A1 | 5/2012 | Vogel |
| 2012/0257116 A1 | 10/2012 | Hendrickson et al. |
| 2012/0265587 A1 | 10/2012 | Kinkead |
| 2012/0290373 A1 | 11/2012 | Ferzacca et al. |
| 2012/0321073 A1 | 12/2012 | Flockhart et al. |
| 2013/0023235 A1 | 1/2013 | Fan et al. |
| 2013/0073361 A1 | 3/2013 | Silver |
| 2013/0085785 A1 | 4/2013 | Rogers et al. |
| 2013/0090963 A1 | 4/2013 | Sharma et al. |
| 2013/0124361 A1 | 5/2013 | Bryson |
| 2013/0136252 A1 | 5/2013 | Kosiba et al. |
| 2013/0223608 A1 | 8/2013 | Flockhart et al. |
| 2013/0236002 A1 | 9/2013 | Jennings et al. |
| 2013/0257877 A1 | 10/2013 | Davis |
| 2013/0304581 A1 | 11/2013 | Soroca et al. |
| 2013/0325972 A1 | 12/2013 | Boston et al. |
| 2014/0012603 A1 | 1/2014 | Scanlon et al. |
| 2014/0016762 A1 | 1/2014 | Mitchell et al. |
| 2014/0039944 A1 | 2/2014 | Humbert et al. |
| 2014/0039962 A1 | 2/2014 | Nudd et al. |
| 2014/0067375 A1 | 3/2014 | Wooters |
| 2014/0079195 A1 | 3/2014 | Srivastava et al. |
| 2014/0079207 A1* | 3/2014 | Zhakov ............ H04M 3/5233 379/265.03 |
| 2014/0099916 A1 | 4/2014 | Mallikarjunan et al. |
| 2014/0101261 A1 | 4/2014 | Wu et al. |
| 2014/0136346 A1 | 5/2014 | Teso |
| 2014/0140494 A1 | 5/2014 | Zhakov |
| 2014/0143018 A1 | 5/2014 | Nies et al. |
| 2014/0143249 A1 | 5/2014 | Cazzanti et al. |
| 2014/0161241 A1 | 6/2014 | Baranovsky et al. |
| 2014/0164502 A1 | 6/2014 | Khodorenko et al. |
| 2014/0177819 A1 | 6/2014 | Vymenets et al. |
| 2014/0188477 A1 | 7/2014 | Zhang |
| 2014/0200988 A1 | 7/2014 | Kassko et al. |
| 2014/0219132 A1 | 8/2014 | Delveaux et al. |
| 2014/0219438 A1 | 8/2014 | Brown et al. |
| 2014/0233719 A1 | 8/2014 | Vymenets et al. |
| 2014/0244712 A1 | 8/2014 | Walters et al. |
| 2014/0254790 A1 | 9/2014 | Shaffer et al. |
| 2014/0257908 A1 | 9/2014 | Steiner et al. |
| 2014/0270108 A1 | 9/2014 | Riahi et al. |
| 2014/0270138 A1 | 9/2014 | Uba et al. |
| 2014/0270142 A1 | 9/2014 | Bischoff et al. |
| 2014/0270145 A1 | 9/2014 | Erhart et al. |
| 2014/0278605 A1 | 9/2014 | Borucki et al. |
| 2014/0278649 A1 | 9/2014 | Guerinik et al. |
| 2014/0279045 A1 | 9/2014 | Shottan et al. |
| 2014/0279050 A1 | 9/2014 | Makar et al. |
| 2014/0314225 A1 | 10/2014 | Riahi et al. |
| 2014/0335480 A1 | 11/2014 | Asenjo et al. |
| 2014/0372171 A1 | 12/2014 | Martin et al. |
| 2014/0379424 A1 | 12/2014 | Shroff |
| 2015/0006400 A1 | 1/2015 | Eng et al. |
| 2015/0010134 A1 | 1/2015 | Erel et al. |
| 2015/0012278 A1 | 1/2015 | Metcalf |
| 2015/0016600 A1 | 1/2015 | Desai et al. |
| 2015/0023484 A1 | 1/2015 | Ni et al. |
| 2015/0030151 A1 | 1/2015 | Bellini et al. |
| 2015/0030152 A1 | 1/2015 | Waxman et al. |
| 2015/0051957 A1 | 2/2015 | Griebeler et al. |
| 2015/0066632 A1 | 3/2015 | Gonzalez et al. |
| 2015/0071418 A1 | 3/2015 | Shaffer et al. |
| 2015/0078538 A1 | 3/2015 | Jain |
| 2015/0100473 A1 | 4/2015 | Manoharan et al. |
| 2015/0127400 A1 | 5/2015 | Chan et al. |
| 2015/0127441 A1 | 5/2015 | Feldman |
| 2015/0127677 A1 | 5/2015 | Wang et al. |
| 2015/0142704 A1 | 5/2015 | London |
| 2015/0172463 A1 | 6/2015 | Quast et al. |
| 2015/0178371 A1 | 6/2015 | Seth et al. |
| 2015/0195406 A1 | 7/2015 | Dwyer et al. |
| 2015/0213454 A1 | 7/2015 | Vedula |
| 2015/0215464 A1 | 7/2015 | Shaffer et al. |
| 2015/0222751 A1 | 8/2015 | Odinak et al. |
| 2015/0256677 A1 | 9/2015 | Konig et al. |
| 2015/0262188 A1 | 9/2015 | Franco |
| 2015/0262208 A1 | 9/2015 | Bjontegard et al. |
| 2015/0269377 A1 | 9/2015 | Gaddipati |
| 2015/0271334 A1 | 9/2015 | Wawrzynowicz |
| 2015/0281445 A1 | 10/2015 | Kumar et al. |
| 2015/0281449 A1 | 10/2015 | Milstein et al. |
| 2015/0281450 A1 | 10/2015 | Shapiro et al. |
| 2015/0281454 A1 | 10/2015 | Milstein et al. |
| 2015/0287410 A1 | 10/2015 | Mengibar et al. |
| 2015/0295788 A1 | 10/2015 | Witzman et al. |
| 2015/0296081 A1 | 10/2015 | Jeong |
| 2015/0334230 A1 | 11/2015 | Volzke |
| 2015/0339446 A1 | 11/2015 | Sperling et al. |
| 2015/0339620 A1 | 11/2015 | Esposito et al. |
| 2015/0339769 A1 | 11/2015 | Deoliveira et al. |
| 2015/0347900 A1 | 12/2015 | Bell et al. |
| 2015/0350429 A1 | 12/2015 | Kumar et al. |
| 2015/0350440 A1 | 12/2015 | Steiner et al. |
| 2015/0350442 A1* | 12/2015 | O'Connor ........... H04M 3/5232 379/265.11 |
| 2015/0350443 A1 | 12/2015 | Kumar et al. |
| 2015/0379562 A1 | 12/2015 | Spievak et al. |
| 2016/0026629 A1 | 1/2016 | Clifford et al. |
| 2016/0034260 A1 | 2/2016 | Ristock et al. |
| 2016/0034995 A1 | 2/2016 | Williams et al. |
| 2016/0036981 A1 | 2/2016 | Hollenberg et al. |
| 2016/0036983 A1 | 2/2016 | Korolev et al. |
| 2016/0042419 A1 | 2/2016 | Singh |
| 2016/0042749 A1 | 2/2016 | Hirose |
| 2016/0055499 A1 | 2/2016 | Hawkins et al. |
| 2016/0057284 A1 | 2/2016 | Nagpal et al. |
| 2016/0065739 A1 | 3/2016 | Brimshan et al. |
| 2016/0080567 A1 | 3/2016 | Hooshiari et al. |
| 2016/0085891 A1 | 3/2016 | Ter et al. |
| 2016/0112867 A1 | 4/2016 | Martinez |
| 2016/0124937 A1 | 5/2016 | Elhaddad |
| 2016/0125456 A1 | 5/2016 | Wu et al. |
| 2016/0134624 A1 | 5/2016 | Jacobson et al. |
| 2016/0140627 A1 | 5/2016 | Moreau et al. |
| 2016/0150086 A1 | 5/2016 | Pickford |
| 2016/0155080 A1 | 6/2016 | Gnanasambandam et al. |
| 2016/0173692 A1 | 6/2016 | Wicaksono et al. |
| 2016/0180381 A1 | 6/2016 | Kaiser et al. |
| 2016/0191699 A1 | 6/2016 | Agrawal et al. |
| 2016/0191709 A1 | 6/2016 | Pullamplavil et al. |
| 2016/0191712 A1 | 6/2016 | Bouzid et al. |
| 2016/0234386 A1 | 8/2016 | Wawrzynowicz |
| 2016/0247165 A1 | 8/2016 | Ryabchun et al. |
| 2016/0261747 A1 | 8/2016 | Thirugnanasundaram et al. |
| 2016/0295018 A1 | 10/2016 | Loftus et al. |
| 2016/0300573 A1 | 10/2016 | Carbune et al. |
| 2016/0335576 A1 | 11/2016 | Peng |
| 2016/0349960 A1 | 12/2016 | Kumar et al. |
| 2016/0358611 A1 | 12/2016 | Abel |
| 2016/0360033 A1 | 12/2016 | Kocan |
| 2016/0378569 A1 | 12/2016 | Ristock et al. |
| 2016/0381222 A1 | 12/2016 | Ristock et al. |
| 2017/0004178 A1 | 1/2017 | Ponting et al. |
| 2017/0006135 A1 | 1/2017 | Siebel et al. |
| 2017/0006161 A9 | 1/2017 | Riahi et al. |
| 2017/0011311 A1 | 1/2017 | Backer et al. |
| 2017/0024762 A1 | 1/2017 | Swaminathan |
| 2017/0032436 A1 | 2/2017 | Disalvo et al. |

(56) References Cited

U.S. PATENT DOCUMENTS

| | | |
|---|---|---|
| 2017/0034226 A1 | 2/2017 | Bostick et al. |
| 2017/0068436 A1 | 3/2017 | Auer et al. |
| 2017/0068854 A1 | 3/2017 | Markiewicz et al. |
| 2017/0098197 A1 | 4/2017 | Yu et al. |
| 2017/0104875 A1 | 4/2017 | Im et al. |
| 2017/0111505 A1 | 4/2017 | Mcgann et al. |
| 2017/0111509 A1 | 4/2017 | Mcgann et al. |
| 2017/0116173 A1 | 4/2017 | Lev-Tov et al. |
| 2017/0118336 A1 | 4/2017 | Tapuhi et al. |
| 2017/0132536 A1 | 5/2017 | Goldstein et al. |
| 2017/0148073 A1 | 5/2017 | Nomula et al. |
| 2017/0155766 A1 | 6/2017 | Kumar et al. |
| 2017/0161439 A1 | 6/2017 | Raduchel et al. |
| 2017/0162197 A1 | 6/2017 | Cohen |
| 2017/0169325 A1 | 6/2017 | Mccord et al. |
| 2017/0207916 A1 | 7/2017 | Luce et al. |
| 2017/0214795 A1 | 7/2017 | Charlson |
| 2017/0220966 A1 | 8/2017 | Wang |
| 2017/0223070 A1 | 8/2017 | Lin |
| 2017/0236512 A1 | 8/2017 | Williams et al. |
| 2017/0286774 A1 | 10/2017 | Gaidon |
| 2017/0288866 A1 | 10/2017 | Vanek et al. |
| 2017/0308794 A1 | 10/2017 | Fischerstrom |
| 2017/0316386 A1 | 11/2017 | Joshi et al. |
| 2017/0323344 A1 | 11/2017 | Nigul |
| 2017/0337578 A1 | 11/2017 | Chittilappilly et al. |
| 2017/0344754 A1 | 11/2017 | Kumar et al. |
| 2017/0344988 A1 | 11/2017 | Cusden et al. |
| 2017/0359421 A1 | 12/2017 | Stoops et al. |
| 2017/0372436 A1 | 12/2017 | Dalal et al. |
| 2018/0018705 A1 | 1/2018 | Tognetti |
| 2018/0032997 A1 | 2/2018 | Gordon et al. |
| 2018/0052664 A1 | 2/2018 | Zhang et al. |
| 2018/0053401 A1 | 2/2018 | Martin et al. |
| 2018/0054464 A1 | 2/2018 | Zhang et al. |
| 2018/0060830 A1 | 3/2018 | Abramovici et al. |
| 2018/0061256 A1 | 3/2018 | Elchik et al. |
| 2018/0077088 A1 | 3/2018 | Cabrera-Cordon et al. |
| 2018/0077250 A1 | 3/2018 | Prasad et al. |
| 2018/0097910 A1 | 4/2018 | D'Agostino et al. |
| 2018/0114234 A1 | 4/2018 | Fighel |
| 2018/0121766 A1 | 5/2018 | Mccord et al. |
| 2018/0137472 A1 | 5/2018 | Gorzela et al. |
| 2018/0137555 A1 | 5/2018 | Clausse et al. |
| 2018/0146093 A1 | 5/2018 | Kumar et al. |
| 2018/0150749 A1 | 5/2018 | Wu et al. |
| 2018/0152558 A1 | 5/2018 | Chan et al. |
| 2018/0164259 A1* | 6/2018 | Liu ................. B01D 15/22 |
| 2018/0165062 A1 | 6/2018 | Yoo et al. |
| 2018/0165691 A1 | 6/2018 | Heater et al. |
| 2018/0165692 A1 | 6/2018 | Mccoy |
| 2018/0165723 A1 | 6/2018 | Wright et al. |
| 2018/0174198 A1 | 6/2018 | Wilkinson et al. |
| 2018/0189273 A1 | 7/2018 | Campos et al. |
| 2018/0190144 A1 | 7/2018 | Corelli et al. |
| 2018/0198917 A1 | 7/2018 | Ristock et al. |
| 2018/0205825 A1 | 7/2018 | Vymenets et al. |
| 2018/0248818 A1 | 8/2018 | Zucker et al. |
| 2018/0260857 A1 | 9/2018 | Kar et al. |
| 2018/0285423 A1 | 10/2018 | Ciano et al. |
| 2018/0286000 A1 | 10/2018 | Berry et al. |
| 2018/0293327 A1 | 10/2018 | Miller et al. |
| 2018/0293532 A1 | 10/2018 | Singh et al. |
| 2018/0300295 A1 | 10/2018 | Maksak et al. |
| 2018/0300641 A1 | 10/2018 | Donn et al. |
| 2018/0308072 A1 | 10/2018 | Smith et al. |
| 2018/0309801 A1 | 10/2018 | Rathod |
| 2018/0349858 A1 | 12/2018 | Walker et al. |
| 2018/0361253 A1 | 12/2018 | Grosso |
| 2018/0365651 A1 | 12/2018 | Sreedhara et al. |
| 2018/0367672 A1 | 12/2018 | Ristock et al. |
| 2018/0372486 A1 | 12/2018 | Farniok et al. |
| 2018/0376002 A1 | 12/2018 | Abraham |
| 2019/0013017 A1 | 1/2019 | Kang et al. |
| 2019/0028587 A1 | 1/2019 | Unitt et al. |
| 2019/0028588 A1 | 1/2019 | Shinseki et al. |
| 2019/0037077 A1 | 1/2019 | Konig et al. |
| 2019/0042988 A1 | 2/2019 | Brown et al. |
| 2019/0043106 A1 | 2/2019 | Talmor et al. |
| 2019/0058793 A1 | 2/2019 | Konig et al. |
| 2019/0104092 A1 | 4/2019 | Koohmarey et al. |
| 2019/0108834 A1 | 4/2019 | Nelson et al. |
| 2019/0130329 A1 | 5/2019 | Fama et al. |
| 2019/0132443 A1 | 5/2019 | Munns et al. |
| 2019/0146647 A1 | 5/2019 | Ramachandran et al. |
| 2019/0147045 A1 | 5/2019 | Kim |
| 2019/0172291 A1 | 6/2019 | Naseath |
| 2019/0180095 A1 | 6/2019 | Ferguson et al. |
| 2019/0180747 A1 | 6/2019 | Back et al. |
| 2019/0182383 A1 | 6/2019 | Shaev et al. |
| 2019/0196676 A1 | 6/2019 | Hillis et al. |
| 2019/0197568 A1 | 6/2019 | Li et al. |
| 2019/0205389 A1 | 7/2019 | Tripathi et al. |
| 2019/0236205 A1 | 8/2019 | Jia et al. |
| 2019/0238680 A1 | 8/2019 | Narayanan et al. |
| 2019/0253553 A1 | 8/2019 | Chishti |
| 2019/0258825 A1 | 8/2019 | Krishnamurthy |
| 2019/0287517 A1 | 9/2019 | Green et al. |
| 2019/0295027 A1 | 9/2019 | Dunne et al. |
| 2019/0306315 A1 | 10/2019 | Portman et al. |
| 2019/0335038 A1 | 10/2019 | Alonso Y Caloca et al. |
| 2019/0341030 A1 | 11/2019 | Hammons et al. |
| 2019/0342450 A1 | 11/2019 | Kulkarni et al. |
| 2019/0349477 A1 | 11/2019 | Kotak |
| 2019/0377789 A1 | 12/2019 | Jegannathan et al. |
| 2019/0378076 A1 | 12/2019 | O'Gorman et al. |
| 2019/0385597 A1 | 12/2019 | Katsamanis et al. |
| 2019/0386917 A1 | 12/2019 | Malin |
| 2019/0392357 A1 | 12/2019 | Surti et al. |
| 2019/0394333 A1 | 12/2019 | Jiron et al. |
| 2020/0005375 A1 | 1/2020 | Sharan et al. |
| 2020/0007680 A1 | 1/2020 | Wozniak |
| 2020/0012697 A1 | 1/2020 | Fan et al. |
| 2020/0012992 A1 | 1/2020 | Chan et al. |
| 2020/0019893 A1 | 1/2020 | Lu |
| 2020/0028968 A1 | 1/2020 | Mendiratta et al. |
| 2020/0050788 A1 | 2/2020 | Feuz et al. |
| 2020/0050996 A1 | 2/2020 | Generes, Jr. et al. |
| 2020/0058299 A1 | 2/2020 | Lee et al. |
| 2020/0076947 A1 | 3/2020 | Deole |
| 2020/0097544 A1 | 3/2020 | Alexander et al. |
| 2020/0104801 A1 | 4/2020 | Kwon et al. |
| 2020/0118215 A1 | 4/2020 | Rao et al. |
| 2020/0119936 A1 | 4/2020 | Balasaygun et al. |
| 2020/0125919 A1 | 4/2020 | Liu et al. |
| 2020/0126126 A1 | 4/2020 | Briancon et al. |
| 2020/0134492 A1 | 4/2020 | Copeland |
| 2020/0134648 A1 | 4/2020 | Qi et al. |
| 2020/0137097 A1 | 4/2020 | Zimmermann et al. |
| 2020/0154170 A1 | 5/2020 | Wu et al. |
| 2020/0160870 A1 | 5/2020 | Baughman et al. |
| 2020/0175478 A1 | 6/2020 | Lee et al. |
| 2020/0193335 A1 | 6/2020 | Sekhar et al. |
| 2020/0193983 A1 | 6/2020 | Choi |
| 2020/0211120 A1 | 7/2020 | Wang et al. |
| 2020/0218766 A1 | 7/2020 | Yaseen et al. |
| 2020/0219500 A1 | 7/2020 | Bender et al. |
| 2020/0242540 A1 | 7/2020 | Rosati et al. |
| 2020/0250272 A1 | 8/2020 | Kantor et al. |
| 2020/0250557 A1 | 8/2020 | Kishimoto et al. |
| 2020/0257996 A1 | 8/2020 | London |
| 2020/0280578 A1 | 9/2020 | Hearty et al. |
| 2020/0280635 A1 | 9/2020 | Barinov et al. |
| 2020/0285936 A1 | 9/2020 | Sen |
| 2020/0329154 A1 | 10/2020 | Baumann et al. |
| 2020/0336567 A1 | 10/2020 | Dumaine |
| 2020/0342868 A1 | 10/2020 | Lou et al. |
| 2020/0351375 A1 | 11/2020 | Lepore et al. |
| 2020/0351405 A1 | 11/2020 | Pace |
| 2020/0357026 A1 | 11/2020 | Liu et al. |
| 2020/0364507 A1 | 11/2020 | Berry |
| 2020/0365148 A1 | 11/2020 | Ji et al. |
| 2020/0395008 A1 | 12/2020 | Cohen et al. |
| 2020/0410506 A1 | 12/2020 | Jones et al. |

(56) References Cited

U.S. PATENT DOCUMENTS

| | | | |
|---|---|---|---|
| 2021/0004536 | A1 | 1/2021 | Adibi et al. |
| 2021/0005206 | A1 | 1/2021 | Adibi et al. |
| 2021/0042839 | A1 | 2/2021 | Adamec |
| 2021/0056481 | A1 | 2/2021 | Wicaksono et al. |
| 2021/0067627 | A1 | 3/2021 | Delker et al. |
| 2021/0081869 | A1 | 3/2021 | Zeelig et al. |
| 2021/0081955 | A1 | 3/2021 | Zeelig et al. |
| 2021/0082417 | A1 | 3/2021 | Zeelig et al. |
| 2021/0082418 | A1 | 3/2021 | Zeelig et al. |
| 2021/0084149 | A1 | 3/2021 | Zeelig et al. |
| 2021/0089762 | A1 | 3/2021 | Rahimi et al. |
| 2021/0091996 | A1 | 3/2021 | Mcconnell et al. |
| 2021/0105361 | A1 | 4/2021 | Bergher et al. |
| 2021/0124843 | A1 | 4/2021 | Vass et al. |
| 2021/0125275 | A1 | 4/2021 | Adibi |
| 2021/0133763 | A1 | 5/2021 | Adibi et al. |
| 2021/0133765 | A1 | 5/2021 | Adibi et al. |
| 2021/0134282 | A1 | 5/2021 | Adibi et al. |
| 2021/0134283 | A1 | 5/2021 | Adibi et al. |
| 2021/0134284 | A1 | 5/2021 | Adibi et al. |
| 2021/0136204 | A1 | 5/2021 | Adibi et al. |
| 2021/0136205 | A1 | 5/2021 | Adibi et al. |
| 2021/0136206 | A1 | 5/2021 | Adibi et al. |
| 2021/0201244 | A1* | 7/2021 | Sella .................. H04M 3/5175 |
| 2021/0295237 | A1* | 9/2021 | Taher ............. G06Q 10/063112 |
| 2021/0405897 | A1* | 12/2021 | Hansalia ............... G06F 3/0604 |
| 2022/0129905 | A1 | 4/2022 | Sethumadhavan et al. |

FOREIGN PATENT DOCUMENTS

| | | |
|---|---|---|
| WO | 2006/037836 A1 | 4/2006 |
| WO | 2012/024316 A2 | 2/2012 |
| WO | 2015/099587 A1 | 7/2015 |
| WO | 2019142743 A1 | 7/2019 |

OTHER PUBLICATIONS

Fan et al., "Demystifying Big Data Analytics for Business Intelligence Through the Lens of Marketing Mix", Big Data Research, vol. 2, Issue 1, Mar. 1, 2015, 16 pages.

An et al,, Towards Automatic Persona Generation Using Social Media Aug. 1, 2016, 2016 IEEE 4th International Conference on Future Internet of Things and Cloud Workshops (FiCloudW), 2 pages.

Bean-Mellinger, Barbara., "What Is the Difference Between Marketing and Advertising?", available on Feb. 12, 2019, retrieved from https://smallbusiness.chron .com/difference-between-marketing-advertising-2504 7 .html, Feb. 12, 2019, 6 pages.

Twin, Alexandra., "Marketing", URL: https://www.investopedia.com/lerms/m/marketing.asp, Mar. 29, 2019, 5 pages.

dictionary.com, "Marketing", URL: https://www.dictionary.com/browse/marketing, Apr. 6, 2019, 7 pages.

Ponn et al., "Correlational Analysis between Weather and 311 Service Request Volume", eil.mie.utoronto.ca., Jan. 1, 2017, 16 pages.

Zhang et al., "A Bayesian approach for modeling and analysis of call center arrivals", Jan. 1, 2013 Winter Simulations Conference (WSC), ieeexplore.ieee.org, pp. 713-723.

Mehrotra et al., "Call Center Simulation Modeling: Methods, Challenges, and Opportunities", Proceedings of the 2003 Winter Simulation Conference, vol. 1, Jan. 1, 2003, pp. 135-143.

Mandelbaum et al., "Staffing Many-Server Queues with Impatient Customers: Constraint Satisfaction in Call Center", Operations Research, Sep.-Oct. 2009, vol. 57, No. 5 (Sep. 1-Oct. 2009), pp. 1189-1205.

Fukunaga et al., "Staff Scheduling for Inbound Call Centers and Customer Contact Centers", Al Magazine, Winter, vol. 23, No. 4, Jan. 1, 2002, pp. 30-40.

Feldman et al., "Staffing of Time-Varying Queues to Achieve Time-Stable Performance", Management Science, Feb. 1, 2008, vol. 54, No. 2, Call Center Management, pp. 324-338.

Business Wire, "Rockwell SSD announces Call Center Simulator", Feb. 4, 1997, 4 pages.

Nathan, Stearns., "Using skills-based routing to the advantage of your contact center", Customer Inter@ction Solutions, Technology Marketing Corporation, May 1, 2001, vol. 19 No. 11, pp. 54-56.

Aldor-Noiman et al., "Workload forecasting for a call center: Methodology and a case study", The Annals of Applied Statistics, vol. 3, No. 4, 2009, pp. 1403-1447.

Koole et al., "An overview of routing and staffing algorithms in multi-skill customer contact centers", 2006, 43 pages.

Krishnan, Krish, "Data Warehousing in the Age of Big Data", Morgan Kaufmann, Chapter 5, 2013, 28 pages.

United States Patent and Trademark Office, Non-Final Office Action for U.S. Appl. No. 16/550,961 dated Mar. 2, 2020.

United States Patent and Trademark Office, Final Office Action for U.S. Appl. No. 16/550,961 dated Jun. 17, 2020.

Aksin et al., "The Modern Call Center: A Multi-Disciplinary Perspective on Operations Management Research", Production and Operations Management, 2007, vol. 16, No. 6, pp. 665-688.

Buesing et al., "Getting the Best Customer Service from your IVR: Fresh eyes on an old problem," [online] McKinsey and Co., published on Feb. 1, 2019, available at: < https://www.nnckinsey.conn/business-functions/operations/our-insights/ getting-the-best-customer-service-from-your-ivr-fresh-eyes . . . (Year: 2019).

Chiu et al., "A multi-agent infrastructure for mobile workforce management in a service oriented enterprise", Proceedings of the 38th annual Hawaii international conference on system sciences, IEEE, 2005, pp. 10.

Diimitrios et al., "An overview of workflow management: From process modeling to workflow automation infrastructure," Distributed and parallel Databases, 1995, vol. 3, No. 2 pp. 119-153.

Ernst et al. "An Annotated Bibliography of Personnel Scheduling and Rostering", CSIRO Mathematical and Information Sciences, 2003, 155 pages.

Ernst et al.,"Staff scheduling and rostering: A review of applications, methods and models," European Journal of Operational Research, 2004, vol. 153, pp. 3-27.

Federal Register, vol. 72, No. 195, Oct. 10, 2007, pp. 57526-57535.

Federal Register, vol. 75, No. 169, Sep. 1, 2010, pp. 53643-53660.

Federal register, vol. 79, No. 241 issued on Dec. 16, 2014, p. 74629, col. 2, *Gottschalk* v. *Benson*.

Federal Register, vol. 84, No. 4, Jan. 7, 2019, pp. 50-57.

Federal Register, vol. 84, No. 4, Jan. 7, 2019, p. 53-55.

Grefen et al., "A reference architecture for workflow management systems", Data & Knowledge Engineering, 1998, vol. 27, No. 1, pp. 31-57.

Signed Aug. 20, 2010.

Huang et al., "Agent-based workflow management in collaborative product development on the Internet", Computer-Aided Design, 2000, vol. 32, No. 2, pp. 133-144.

Janarthanam, "Hands on Chatbots and conversational UI development: Build chatbots and voice user interfaces with Chatfuel, Dialogflow, Microsoft Bot Framework, Twilio, and Alexa Skills" Dec. 2017.

Myers et al., "At the Boundary of Workflow and AI", Proc. AAAI 1999 Workshop on Agent-Based Systems in The Business Context, 1999, 09 pages.

Niven, "Can music with prosocial lyrics heal the working world? A field intervention in a call center." Journal of Applied Social Psychology, 2015; 45(3), 132-138. doi:10.1111/jasp.12282).

On Hold Marketing, "Growing Your Business with Customized on-Hold Messaging" (Published on Apr. 5, 2018 at https://adhq.com/about/ad-news/growing-your-business-with-customized-on-hold-messaging) (Year: 2018).

U.S. Appl. No. 16/668,214, NFOA mailed Nov. 10, 2021.

U.S. Appl. No. 16/668,215, NFOA mailed Dec. 7, 2021.

Van Den Bergh et al. "Personnel scheduling: A literature review", European journal of operational research, 2013, vol. 226, No. 3 pp. 367-385.

\* cited by examiner

METHOD, APPARATUS, AND COMPUTER-READABLE MEDIUM FOR MANAGING CONCURRENT COMMUNICATIONS IN A NETWORKED CALL CENTER

RELATED APPLICATION DATA

This application is a continuation-in-part of U.S. application Ser. No. 16/744,397, the entire disclosure of which is incorporated herein by reference.

FIELD OF THE INVENTION

The invention relates to managing concurrent communications in a networked call center by scheduling agents for handing the communications in a manner that achieves desired service levels.

BACKGROUND

Assigning workers to shifts in a manner that allows the workers to handle tasks in an efficient manner is a critical part of many businesses. For a business such as a contact center (also referred to herein as a "call center"), workers (e.g., agents) are assigned to tasks (e.g., incoming communications) based on skills associated with each agent and the skills required for the tasks. One mechanism for matching the communications with the skills of an agent is to associate the communications with a "queue" that represents a category of the communication, such as Technical Support, or Billing Issues. Agents with the requisite skills can then be assigned to one or more appropriate queues over specific time intervals.

As may be appreciated, when an agent has the requisite skills to work multiple queues, the call center may have difficulty determining which scheduling assignment is optimal because there is no easy way to see how the agent is contributing across all of their queues. One solution is simulating the work on all of the queues with different agent assignments. However, to handle communications most efficiently, agents with the requisite skills must be scheduled for times when communications requiring those skills are likely to be received. Matching agents to communications while maintaining efficient staff levels and meeting requisite service levels is a highly complex process.

SUMMARY

The disclosed implementations address an agent's contribution to each of the queues taking into consideration the concurrent maximum communication assigned to each agent. One aspect of the invention is a method for scheduling agents in a call center to meet predefined service levels, wherein communications are associated with queues representing categories of communications, the queues including at least one concurrent queue of concurrent communications, wherein multiple concurrent communications can be handled concurrently by a single agent, the method comprising: executing a simulation to determine an effectiveness of plural agents, the simulation including: computing a skill group weighting (SGW) for each agent for at least one concurrent queue and at least one interval based on:

$t_c$, the time spent by the agent on queue C communications $t_{all}$, the time spent by the agent on all concurrent communications $t_e$, the elapsed concurrent time that the agent has spent on communications in the interval $t_n$, the non-idle time of the agent; and scheduling the agents based on the SGW and max capacity of concurrent communications for each agent.

Another aspect of the invention is a system for scheduling agents in a call center to meet predefined service levels, wherein communications are associated with queues representing categories of communications, the queues including at least one concurrent queue of concurrent communications, wherein multiple concurrent communications can be handled concurrently by a single agent, the system comprising at least one computer hardware processor and at least one memory device storing instructions which, when executed by the at least one processor, cause the at least one processor to carry out a method of: executing a simulation to determine an effectiveness of plural agents, the simulation including: computing a skill group weighting (SGW) for each agent for at least one concurrent queue and at least one interval based on:

$t_c$, the time spent by the agent on queue C communications $t_{all}$, the time spent by the agent on all concurrent communications $t_e$, the elapsed concurrent time for the agent $t_n$, the non-idle time of the agent; and scheduling the agents based on the SGW and max capacity of concurrent communications for each agent.

Another aspect of the invention is non-transient computer-readable media having instructions stored thereon which, when executed by a computer processor, cause the computer processor to carry out the method comprising: executing a simulation to determine an effectiveness of plural agents, the simulation including: computing a skill group weighting (SGW) for each agent for at least one concurrent queue and at least one interval based on:

scheduling the agents based on the SGW and max capacity of concurrent communications for each agent.

DETAILED DESCRIPTION

Figure 1:
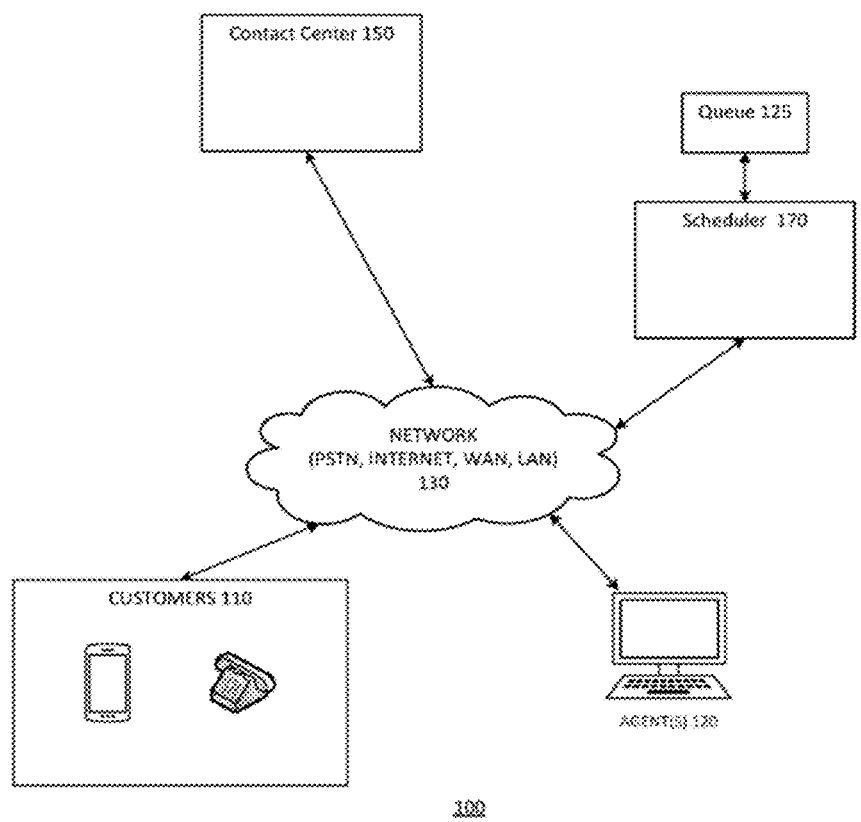
FIG. 1 is a schematic diagram of a call center computing architecture in accordance with a disclosed implementation.

U.S. patent application Ser. No. 16/668,525, the disclosure of which is incorporated herein, discloses that a simulation can be performed for a contact center with multiple queues. In a simulation, agents from the skill groups are assigned to the queues based on the skills associated with the agents in a skill group (a group of agents with common skills) and the skills required by the queues, and predicted communications are matched to the queues by a matching engine. The simulation may be performed multiple times over multiple intervals. After the simulations are complete, for each skill group and for each interval, the amount of time that each agent spent working using each skill associated with the skill group is determined for each interval, and an average time for each skill is calculated across all of the agents for each interval. U.S. patent application Ser. No. 16/744,397, the disclosure of which is incorporated herein, discloses how to provide simulation for "deferred" communications, i.e., communications for which a substantially immediate response is not required.

The average times for each skill associated with the skill group is used to create a skill group weight for the skill group for each interval. When a scheduling engine is determining which queue to place an agent in for one or more intervals, the skill group weights for the intervals are used to calculate a score for some or all of the queues based on different placements of the agent. The placement that results in the best score (e.g., lowest) may be implemented by the contact center in agent scheduling. Because the simulations are used to generate the skill group weights ahead of time (i.e., before the agents are scheduled), the agents can be quickly and efficiently placed in queues without having to simulate the queues each time a placement is needed.

During a simulation, a call center scheduling algorithm attempts to place shifts in a fashion that maximizes their utility, for example guaranteeing a desired service level while respecting legal constraints and minimizing operational overhead. When scheduling, agents can be allocated to a shift and the impact on the workload and service levels of each queue at each interval of that shift can be assessed. This impact is directly related to the agent's contribution to the work capacity.

Disclosed implementations are discussed in the context of a call center. However, the innovations disclosed herein can be applied to directing any items or tasks to a specific party, such as an agent or other service provider. In a traditional contact center, an agent picks up one communication (like a call) at a time, works on it, then moves on to the next item. Such communications are referred to as "non-concurrent" herein. However, certain communications, such as chat or social media communications, allow an agent to work on multiple communications at the same time. Such communications are referred to as "concurrent communications" herein. For example, an agent can pick up multiple chats and work on all of them before finishing even the first one.

Each agent can handle a maximum number of concurrent communications based on, for example, the agent's experience, skill levels, and mental acuity. Therefore, the maximum number of concurrent communication of an agent is a personal setting, defined by the agent and/or their supervisor, for example. Therefore, an agent that can handle a maximum of 4 concurrent items has the same throughput as 2 agents that can handle a maximum of 2 items each. Further, an agent that is already engaged in a concurrent item can start another concurrent item, but not a non-concurrent item (like a call). Also, it might be desirable to require that an agent can only start a non-concurrent item after finishing all the concurrent ones because, by definition, a concurrent item requires the agent's attention constantly until completed. when routing communications, a concurrent communication can be assumed to take a percentage of the agent's attention, e.g., 20% for some queues and 50% for another. In this case, a communication can only be routed to an agent who is idle or is working on concurrent items and has a percent attention open which is greater than or equal to the percent attention required for the new concurrent communication. In this alternative, the max concurrent items used in the shrinkage calculator is computed as 1/(percent attention requires). For example, a queue that takes 20% of the agent's attention would have a max concurrent of 5.

FIG. 1 illustrates components, functional capabilities and optional modules that may be included in a cloud-based contact center infrastructure solution. Customers 110 interact with a contact center 150 using voice, email, text, and web interfaces to communicate with agent(s) 120 through a network 130 and one or more of text or multimedia channels. The agent(s) 120 may be remote from the contact center 150 and may handle communications with customers 110 on behalf of an enterprise. The agent(s) 120 may utilize devices, such as but not limited to, workstations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

In some implementations, agents 120 may be assigned to one or more queues 125, and the agents 120 assigned to a queue 125 may handle communications that are placed in the queue by the contact center 150. Agents 120 and queues 125 may each be associated with one or more skills. The skills may include language proficiency (e.g., English, Spanish, and Chinese), proficiency with certain software applications (e.g., word-processors and spreadsheets), training level (e.g., having taken a particular course or passed a particular test), seniority (e.g., number of years working as an agent 120), achievements (e.g., meeting certain performance or quality goals, receiving positive performance reviews, or receiving positive reviews or ratings from customers 120). Other types of skills may be supported. The skills associated with an agent 120 may be the skills that the agent 120 possesses. The skills associated with a queue 125 may be the minimum set of skills that an agent 120 should posses to handle calls from the queue 125. The skills associated with a queue 125 may be set by a user or administrator.

To facilitate the assignment of agents 120 to queues, the environment 100 may further include a scheduler 170. The scheduler 170 may assign agents 120 to queues 125 based on the skills associated with the agents 120, the skills associated with the queues 125, and what is referred to herein as a "staffing" associated with each queue. The staffing associated with a queue 125 may be the minimum number of agents 120 that are needed to work on a queue 125 to maintain a particular service level. The service level may be defined by one or more metrics such as the maximum amount of time a customer 110 can be expected to wait to speak with an agent 120, for example. Other metrics may also be used.

The scheduler 170 may assign agents 120 to queues 125 for one or more intervals. An interval may be the smallest amount of time that an agent 120 can be scheduled for.

Intervals used by the contact center 150 may be fifteen minutes, thirty minutes, forty-five minutes, or any appropriate time interval. The particular agents 120 assigned to a queue 125 for an interval is referred to herein as an "agent assignment." The scheduler 170 may generate the staffing for a queue 125 for an interval based on a predicted workload for the queue 125 during the interval. The predicted workload may be based on historical workload data for the queue 125 and/or contact center 150 or may be provided by a user or administrator. Any method for predicting the workload of a queue 120 may be used.

The scheduler 170 may generate an agent assignment for a queue 125 for each interval based on the staffing generated for the queue 125 for the interval. For example, the call center 150 may use fifteen-minute intervals. The scheduler 170 may generate an agent assignment for the queue 125 for the 8:00 am interval based on the staffing for the interval, another agent assignment for the 8:15 am interval based on the staffing for the interval, and another assignment for the 8:30 am interval based on the staffing for the interval.

Figure 2:
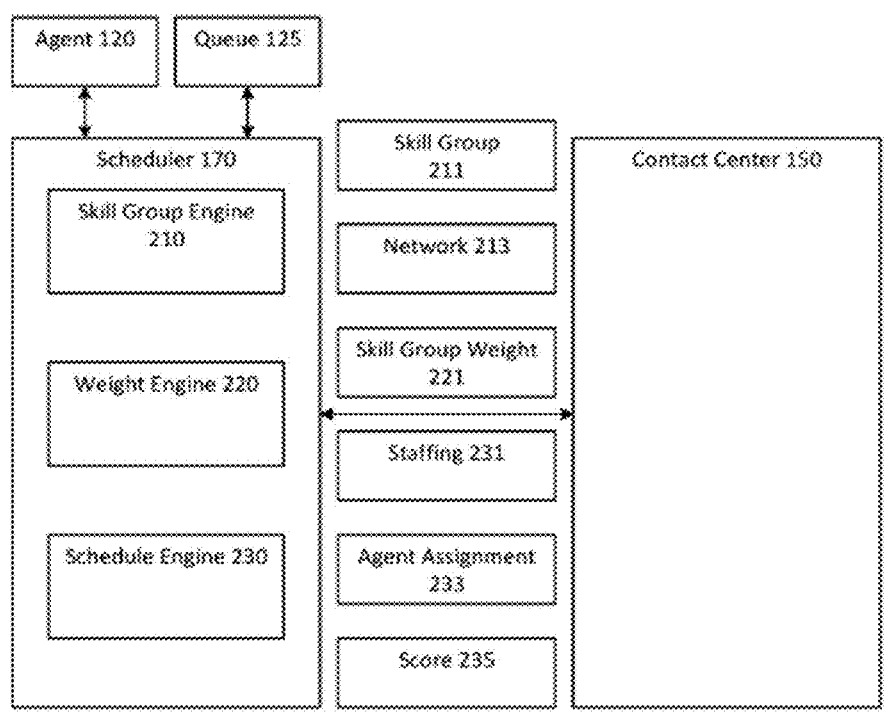
FIG. 2 is a schematic diagram of system architecture for incorporating a scheduler into a contact center in accordance with a disclosed implementation.

FIG. 2 illustrates a system architecture for incorporating a scheduler 170 into a business or entity such as a contact center 150. As shown the scheduler 170 includes various modules and components such as a skill group engine 210, a weight engine 220, and a schedule engine 230. More or fewer modules or components may be supported by scheduler 170. Each of the skill group engine 210, weight engine 220, and the schedule engine 230 may be implemented together or separately by one or more general purpose computing devices programmed with computer executable code that is stored in one or more non-transient memory devices. Furthermore, while shown as separate from the scheduler 170, in some implementations the scheduler 170 may be implemented as a component of the contact center 150.

The skill group engine 210 may divide or assign the agents 120 into skill groups 211. A skill group 211 may be a grouping of agents 120 based on the skills associated with each agent 120. In some implementations, each agent 120 associated with a skill group 211 may be associated with the same skills. The skills associated with a skill group 211 may be the skills associated with each of the agents 120 in the skill group 211. Each agent 120 may be assigned by the skill group engine 120 into only one skill group 211. Any method for assigning agents 120 into skill groups 211 may be used.

In some implementations, the skill group engine 210 may group agents 120 into skill groups 211 that have similar skills, rather than exactly the same skills. This type of grouping is referred to herein as a fuzzy skill group. For example, an agent 120 that is associated with the skills English and Spanish may be added to a skill group 211 associated with the skills English, Spanish, and Portuguese, even though the agent 120 does not speak Portuguese. Depending on the implementation, the skill group engine 210 may determine to "relax" skills that are not popular or that are not associated with many queues 125 in the contact center 150. Continuing the example above, the skill group engine 120 may have determined that the skill Portuguese is associated with very few queues 125, and/or the queues 125 that are associated with the skill Portuguese are not very busy or have low staffing 121.

After all of the agents 120 have been assigned to a skill group 211, the skill group engine 210 may further divide the skill groups 211 into what are referred to herein as networks 213. A network 213 may be a set of skill groups 211 where each skill group 211 in the network 213 has at least one skill in common with at least one other skill group 211 in the network 213. In addition, no skill group 211 in a first network 213 has any skill in common with any skill group 211 in a second network 213.

In some implementations, the skill group engine 210 may create a network 213 by selecting a skill group 211 for the network 213. The skill group engine 210 may determine the queue 125 that the agents 120 associated with the selected skill group 211 could work. Of the determined queues 125, the skill group engine 210 may determine the skill groups 211 whose agents 120 can work in the determined queues 125. These determined skill groups 211 may be added to the network 213. The skill group engine 210 may then continue adding skill groups 211 in this fashion until no more skill groups 211 can be added to the network 213.

The skill group engine 210 may then select a skill group 211 that has not yet been added to a network 213 and may create a network 213 using the selected skill group 211 as described above. As will be clearer based on the disclosure below, because none of the skill groups 211 in one network have any skills in common with the skill groups 211 in another network, the weight engine 220 may perform simulations and may calculate skill group weights 221 for the skill groups 211 in each network 213 in parallel.

The weight engine 220 may calculate a skill group weight 221 for each skill group 211 in a network 213 for each interval. As used herein, a skill group weight 221 for a skill group 211 may be a data structure that includes a weight for each skill associated with the skill group 211 for an interval. The weight for each skill may be based on how often an agent 120 from the skill group 211 worked on a task or communication that involves the skill during the associated interval. For example, if agent 120 in a skill group 211 spent 90% of their time in an interval working on the skill Spanish and 10% of their time in the interval working on the skill English, the skill group weight 221 for the skill group 211 for the interval would be 0.90 and 0.10.

In some implementations, the weight engine 220 may calculate the skill group weight 221 for a skill group 211, by running one or more simulations of the contact center 150. The simulation may be based on historical data for the contact center 150 and may simulate the customers 110, agents 120, and queues 125 associated with the contact center 150 for one or more intervals. Any method for simulating a contact center 150 may be used.

The weight engine 220 may determine from the simulations, how much time each agent 120 of the skill group 211 spent working using each of its skills during an interval. The determined times may be used by the weight engine 220 to determine a distribution of the agent's time across the skills during the interval. The distribution for each skill may be used as the weight for the skill for the interval. For example, If at 8 am on Monday the agent 120 spent 30% of his time on the skill English, 60% on the skill Spanish, and was idle 10% of the time (and the agent 120 is the only one in the skill group 211), the weight for the English skill during the interval Monday 8 am would be 0.333 (i.e., 30%/{30%+60%}) and the weight for the Spanish skill during the interval Monday 8 am would be 0.666 (i.e., 60%/{30%+60%}). Assuming the values are the same for every interval, the skill group weights 221 for three intervals for the skill group 211 of English and Spanish would be English (0.33, 0.33, 0.33) and Spanish (0.67, 0.67, 0.67).

Depending on the implementation, the skill group weight 221 for a skill group 211 during an interval may be determined by averaging the skill group weights 221 determined for each of the agents 120 in the skill group 211 over the interval. Note that in the event that a particular agent 120 does not do any work during a particular interval event though there was work to be done, in some implementations, the weights of the skill group weight 221 may be assigned by the weight engine 220 proportionally based on the workload of the queues that the other agents 120 in the skill group 211 worked. Depending on the implementation, the weights may be assigned such that the sum of the weights is always 1. Other methods for assigning the weights may be used.

The weight engine 220 may, after running each simulation of the contact center 150 for each interval, add up the number of agents 120 working on a particular skill weighted by the skill group weight 221 computed for their associated skill group 211. The computed number of agents 120 for each skill group 211 for each interval may provide a potential staffing curve for each skill that is referred to herein as "PS_SGW". Note that in some implementations, agents 120 having only a single skill may not be considered when adding the number of agents 120 for each interval. As may be appreciated, if an agent 120 has only a single skill, then there may be no issue with determining how to divide the time of the agent 120.

Continuing the example above, in the simulation there may be two agents 120 having the skill English in a first interval, and three agents 120 having the skill English in the other two intervals. There may be one agent 120 having the skill Spanish in each of the three intervals. Assume there are four agents 120 in the skill group 211 of English and Spanish, and that the multi-skilled agents 120 were occupied 30/60/10 in intervals one and two (as discussed above), and occupied 60/20/20 in interval three (i.e., 0.75 in English, 0.25 in Spanish). Accordingly, the staffing curve PS_SGW for the three intervals would be English {1.32, 1.32, 3) and Spanish (2.68, 2.68, 1).

For real-time queues 125, the weight engine 220 may use reverse Erlang C, Erlang A, or a similar formula to compute the required staffing 231 for each skill and queue 125. Depending on the implementation, the required staffing 231 may be the number of agents 120 needed to work a queue 125 in order to meet a desired service level. The service level may be provided by one or more of the simulations ran by the weight engine 220.

The Erlang formula is a known mathematical equation for calculating the number of agents that is needed in a call center, given the number of calls and the desired service level to be achieved. The Erlang formula takes inputs like interaction volume, average handling time, and staffing and outputs a predicted service level. As may be appreciated, the weight engine 220 may reverse an Erlang formula to predict the staffing 231 required for the service level. For example, the weight engine 220 may use the service level provided by the simulation (along with the interaction volume and average handling time if available) and an Erlang formula to predict the staffing 231. The predicted staffing 231 for each interval may form a curve that is referred to herein as "PS_Erlang". In order to account for single skilled agents 120, the weight engine 220 can remove these from PS_Erlang to generate a new Erlang staffing curve for just the multi-skilled agents 120. This curve is referred to herein as "PS MSE".

The weight engine 220 may calculate the final skill group weights 221 for each skill group 211 by, for each skill group 211, adjusting each weight in the skill group weight 221 up by a percentage difference between the curves PS_SGW and PS_MSE for each interval for that skill. Continuing the example above, if PS_MSE was 20% higher than PS_SGW for the English skill in interval one, the final weight for English for the skill group 211 of English and Spanish in that interval would be 36% (i.e., 30%*1.2). Because this process is used to model the increasing effect of having a multi-skilled agent that can work on other queues 125 when one is idle, this process may be skipped for non-real-time queues 125.

As another example, the curve PS_Erlang may have the following weights for the skills English and Spanish of a skill group 221 for the intervals one, two, and three: PS_Erlang: English (3.5, 6, 5.5) and Spanish (3, 2, 3). The weight engine 220 may subtract the effect of the single skill agents 120 to get PS_MSE: English (1.5, 3, 2.5) and Spanish (2, 1, 2). From the example above, the value of PS_SGW for the intervals was PS_SGW: English {1.32, 1.32, 3) & Spanish (2.68, 2.68, 1), and the value of the skill group weight 221 for the intervals for the skill group 211 of English and Spanish was English (0.33, 0.33, 0.75) & Spanish (0.67, 0.67, 0.25).

The weight engine 220 may calculate the percent difference between PS_MSE and PS_SGW for each skill of the skill group weight 221 at each interval to get: English {1.13, 2.27, 0.83) and Spanish (0.75, 0.75, 2). Finally, the weight engine 220 may multiply the skill group weights 221 for the intervals by the differences to get the final skill group weights 221 for the intervals of: English (0.37, 0.75, 0.75) and Spanish (0.67, 0.67, 0.5).

In some implementations, when the weight engine 220 attempts to calculate a skill group weight 221 for a skill group 211 for a certain interval, during the simulation no agents 120 (or few agents 120) may have done any work with respect to some or all of the skills associated with the skill group 211 for that interval. Because no (or little) work was performed, it may be difficult for the weight engine 220 to determine the appropriate skill group weights 221 for the interval.

Depending on the implementation, the weight engine 220 may solve this problem in various ways. One solution is to find another interval having similar characteristics as the current interval. For example, the weight engine 220 may find an interval with a similar interaction volume or average handling time. The weight engine 220 may use the calculated skill group weight 221 for the skill group 211 for the similar interval for the current interval.

Another solution is to use a skill group weight 221 calculated for a similar skill group 211 for the same interval. For example, the weight engine 220 may select a skill group 211 with the most skills in common with the current skill group 211 and may determine the skill group weight 221 for the current skill group 221 based on the skill group weight 221 of the common skill group 211.

As another solution, the weight engine 220 may use the skill group weight 221 calculated for the current interval for a different simulation of the contact center 150 in the current set of simulations. Further, if so suitable skill group weight 221 is found in the current simulations for the current interval, the weight engine 220 may consider skill group weights 221 calculated for the same interval in past sets of simulations.

The weight engine 220 may attempt to find a suitable skill group weight 221 for the current interval using the methods described above. If no such skill group weight can be determined using any of the described methods, the weight engine 220 may use combinations of the above methods.

The skill group weights 221 may be calculated by the weight engine 220 periodically, and preferably before the skill group weights 221 are needed to place agents 120. As may be appreciated, simulating one or more queues 125 of a contact center 150 based on schedules and forecasts can be a very time consuming and resource intensive operation. Accordingly, the simulations may run periodically to generate the skill group weights 211, and the skill groups weights 211 may be later used when needed to place agents 120. This in an improvement over prior art systems that run simulations each time an agent 120 placement is needed, which is inefficient and results in delayed agent 120 placement.

The schedule engine 230 may use the calculated skill group weights 221 for each queue 125 for each interval to determine which queue 120 to place an agent 120 based on the skills associated with the agent 120. Depending on the implementation, the schedule engine 230 may receive a request to generate an agent assignment 233 for a set of queues 125 for one or more intervals. The agent assignment 233 may be an assignment of one or more agents 120 to the queues 125 of the contact center 150 for the one or more intervals.

As one example, the schedule engine 230 may receive a request for an agent assignment 233 of a plurality of agents 120 to a plurality of queues 125 for an interval. For each of some number of iterations, the schedule engine 230 may place the agents 120 into the queues 125 based on the skills required by each queue 125 and the skills associated with each agent 120 according to the required staffing of each queue 125 to generate an agent assignment 233.

After generating the assignment 233, the schedule engine 230 may calculate a score 235 for each of the queues 125 for the iteration. The score 235 for a queue 125 may be calculated based on the staffing 231 associated with the queue 125 and the skill group weights 221 associated with skill groups 211 of the agents 120 assigned to the queue 120. Depending on the implementation, the scores 235 may be calculated using a delta squared objective function. However, other functions may be used.

Generally, the schedule engine 230 may calculate a score 235 for a queue 125 for one or more intervals by, for each interval, taking the required staffing 231 for the interval minus the product of the number of agents 120 assigned to the queue 120 for the interval and the weight of the skill group weight 211 for the skill group 211 associated with the agents 120. The sum over each interval for the queue 125 may be the score for the queue 120.

For example, continuing the example from above. Assume a skill group weight 221 for the skill group 211 of English and Spanish for three intervals is English (0.37, 0.75, 0.75) and Spanish (0.67, 0.67. and 0.5). The schedule engine 230 may be calculating the score 235 for the placement of agents 120 from the skill group 211. There may be five agents 120 from the skill group 211 English and Spanish that may be placed in a queue 125 that has the required staffing 231 of one agent 120 with the skill English and two agents 120 with the skill Spanish for the first interval, five agents 120 with the skill English and one agent 120 with the skill Spanish for the second interval, and three agents 120 with the skill English and zero agents 120 with the skill Spanish for the third interval.

Already part of the agent assignment 233 for the three intervals may be agents 120 from the skill group 211 Spanish and agents from the skill group 211 English (i.e., single skill groups). In particular, there may be two agents 120 from the skill group 211 English and one agent 120 from the skill group 211 Spanish assign to work the first interval, there may be three agents 120 from the skill group 211 English and one agent 120 from the skill group 211 Spanish assign to work the second interval, and there may be three agents 120 from the skill group 211 English and one agent 120 from the skill group 211 Spanish assign to work the third interval.

The schedule engine 230 may calculate the score 235 for assigning the five agents 120 from the skill group 211 English and Spanish to the queue 125 using a delta squared objective function. In particular, the schedule engine 230 may calculate for each queue 125, and for each interval, the sum of the required agents 120 for each interval minus the number of agents 120 working times their skill group weight 221 for that skill. Thus, the score 235 for the queue 125 for the skill English would be:

$$(1-(2+(5*0.37)))2+(5-(3+(5*0.75)))2+(3-(3+(5*0.75)))2=25$$

Similarly, the score 235 for the queue 125 for the skill Spanish would be:

$$(2-(1+(5*0.67)))2+(1-(1+(5*0.67)))2+(0-(1+(5*0.5)))2=29$$

Accordingly, the total score 235 for the placement of the five agents 120 from the skill group 211 English and Spanish in the queue 125 for the three intervals would be 54.

After each of the iterations are completed, the schedule engine 230 may select the assignment 233 that received the overall best scores 235. Generally, the lower the score 235 the better the agent assignment 233 with respect to the associated queue 125. Accordingly, the schedule engine 230 may select the assignment that received the lowest total score across all of the queues 125.

Figure 3:
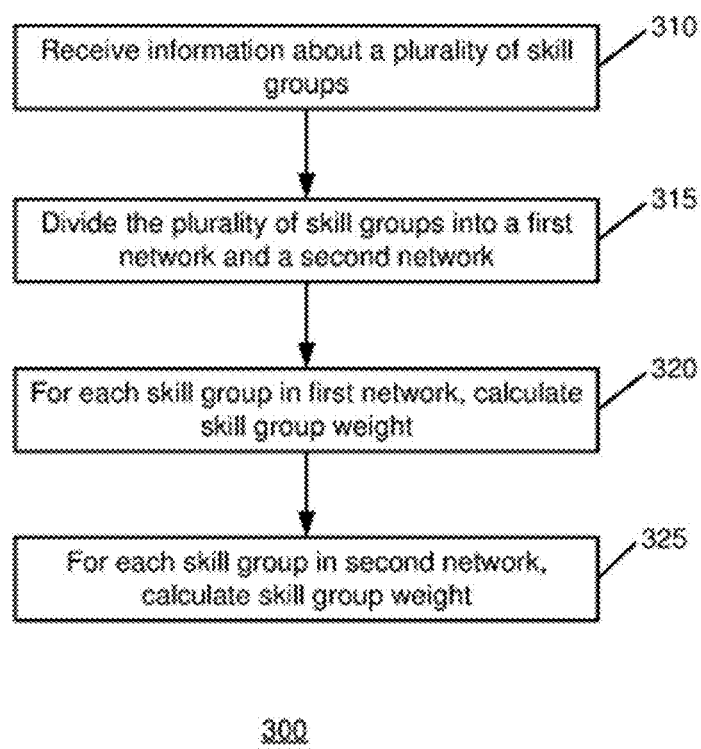
FIG. 3 is a flow chart of a process for calculating skill group weights in accordance with a disclosed implementation.

FIG. 3 illustrates method 300 for dividing skill groups into a plurality of networks, and for calculating skill group weights for the skill groups in each network in parallel. The method 300 may be implemented by the scheduler 170.

At 310, information about a plurality of skill groups is received. The information may be received by the skill group engine 210 of the scheduler 170. Each skill group 211 may include one or more agents 120. In some implementations, the information may associate each skill group 211 with one or more skills. Each agent 120 may have some or all of the skills associated with its skill group 211.

At 315, the plurality of skill groups is divided into a first network and a second network. The plurality of skill groups 211 may be divided by the skill group engine 210. Each network 213 may include skill groups 211 that have no associated skills in common with any skill groups 211 in any other network 213. While only a first network 213 and a second network 213 are described, it is for illustrative purposes only; there is no limit to the number of networks 213 that may be supported.

At 320, for each skill group in the first network, a skill group weight is calculated. The skill group weights 211 may be calculated by the weight engine 220 for the same one or more intervals. As described above, the skill group weight 221 for a skill group 211 at an interval may be calculated by running simulations of the contact center 150 for the agents 120 in the skill group 211.

At 325, for each skill group in the second network, a skill group weight is calculated. The skill group weights 221 may be calculated by the weight engine 220 for the same one or more intervals. Because the first network 213 and the second network 213 have no skill groups 211 in common, the skill group weights 221 for the second network 213 may be calculated substantially in parallel with the skill group weights 221 for the first network 213.

Figure 4:
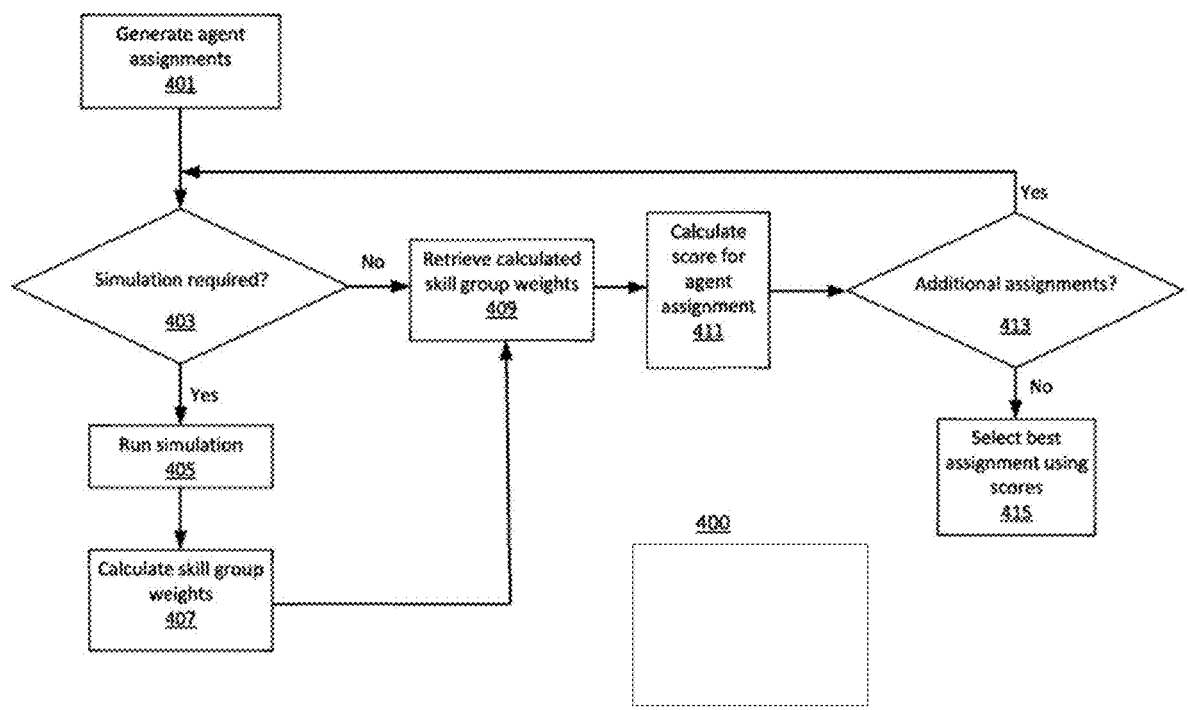
FIG. 4 is a flow chart of logic for creating a staffing schedule in accordance with a disclosed implementation.

FIG. 4 is an illustration of an example method 400 for generating and implementing an agent assignment 233 based on skill group weights 221. The method 400 may be implemented by the scheduler 170. At 401, a plurality of agent assignments is generated. The agent assignments 233 may be generated by the schedule engine 230 of the scheduler 170 for an interval by assigning agents 120 to queues 125 based on the skills associated with each agent 120 and the required staffing 231 needed to meet a desired service level for the interval. Any method for generating agent assignments 233 may be used.

At 403, a determination is made as to whether a simulation is required. The determination may be made by the weight engine 220. Depending on the implementation, the simulation of the contact center 150 and/or the queues 125 may be required when the interval has not yet been simulated by the weight engine 220, or a threshold amount of time has passed since a last simulation. If a simulation is required, the method 400 may continue at 405. Else, the method may continue at 409.

At 405, a simulation is ran. The contact center 150 may be simulated by the weight engine 220 for an interval. The contact center 150 may be simulated for the interval based on historical data about how busy the various agents 120 and queues 125 were handling communications for customers 110 of the contact center 150 for the same or similar intervals. Other information about the contact center 150 such as the IVO and AHT associated with the agents 120 may be used for the simulation. Depending on the implementation, the contact center 150 may be simulated multiple times for the interval. Any method for simulating a contact center 150 may be used.

At 407, skill group weights are calculated. The skill group weight 221 for each skill group 211 associated with an agent 120 may be calculated by the weight engine 220 using the results of the simulations. In some implementations, the weight engine 220 may calculate the skill group weight 221 for a skill group 211 by determining the amount of time that each agent 120 associated with the skill group 211 spent working on each associated skill. The determined amount of time for each skill may be used to determine the skill group weight 221. After calculating the skill group weights 221 for each skill group 211 for the interval, the skill group weights 221 may be stored for later use.

At 409, calculated skill group weights are retrieved. The calculated skill group weights 221 for the interval may be retrieved by the weight engine 220.

At 411, a score is calculated for the agent assignment. The score 235 for the agent assignment 233 may be calculated by the schedule engine 230. The score 235 may be calculated for the agent assignment 233 for the interval based on the skill group weights 221 associated with each skill group 211, the agents 120 assigned to each queue 120, and the required staffing 231 of the queues 125 for the interval. Depending on the implementation, the scores 235 may be calculated using a delta squared objective function.

At 413, a determination is made as to whether there are additional assignments to score. If there are additional assignments 233 to score, the method 400 may return to 403. Else, the method 400 may continue to 415.

At 415, the best assignment is selected based on the scores. The best agent assignment 233 may be selected by the schedule engine 230 of the scheduler 170. Depending on the implementation, the agent assignment 233 with the lowest (or highest) associated score 235 may be the best assignment 233. The selected assignment 233 may be implemented by the contact center 150 for the interval.

Figure 5:
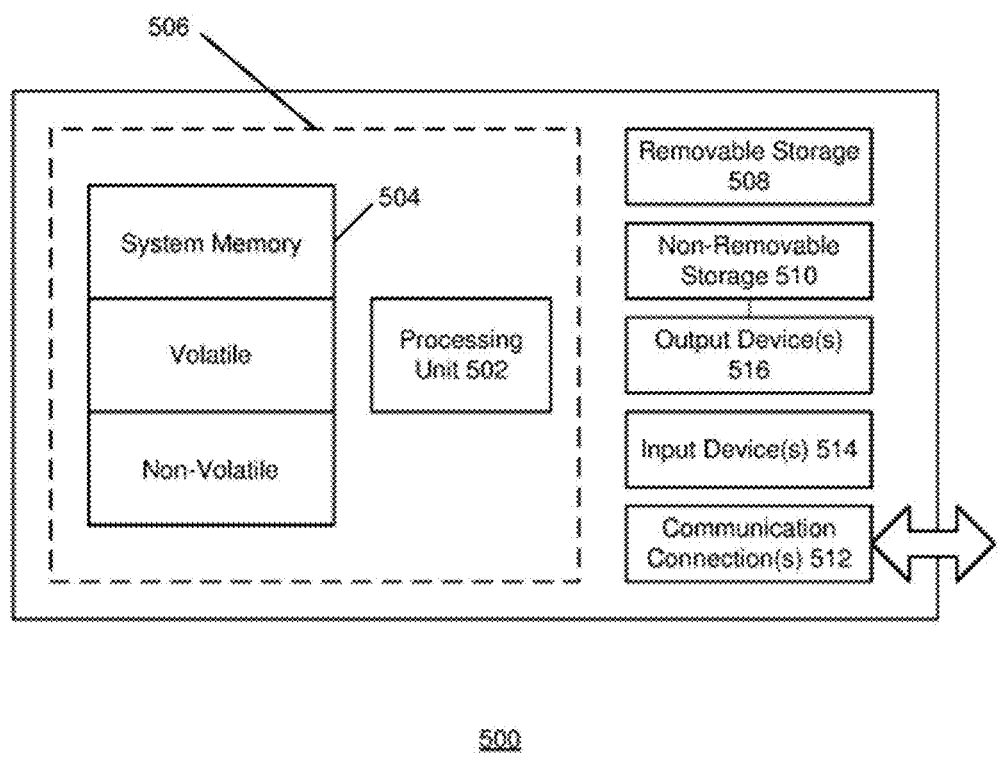
FIG. 5 is a block diagram of a computing device that can be used in disclosed implementations.

FIG. 5 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like. Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of tangible computer readable media. Computer readable media can be any available tangible media that can be accessed by device 500 and includes both volatile and non-volatile media, removable and non-removable media. Tangible, non-transient computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Returning to FIG. 1, agent(s) 120 and customers 110 may communicate with each other and with other services over the network 130. For example, a customer calling on telephone handset may connect through the PSTN and terminate on a private branch exchange (PBX). A video call originating from a tablet may connect through the network 130 terminate on the media server. A smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. In yet another example, Social media, email, SMS/MMS, IM may communicate with their counterpart's application (not shown) within the contact center 150.

The contact center 150 itself be in a single location or may be cloud-based and distributed over a plurality of locations. The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered. Campaign management may be performed by an application to design, schedule, execute and manage outbound campaigns. Campaign management systems are also used to analyze campaign effectiveness.

For inbound SIP messages, the routing server may use statistical data from reporting/dashboard information and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

The integration of real-time and non-real-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

The simulation discussed above generates events for each communication (call, email, chat, or the like) and agent staffing change. This effectively mimics the operation of the contact center: work items arriving, waiting in the queue, being handled by the agents, agents going on/off shift, . . . . To perform the simulation, estimations of the arrival numbers and average handling times of each work queue can be obtained, from an external provider for example. Also, agents scheduling information (e.g., shift intervals and breaks) can be obtained, from an external provider for example, The simulation can be organized in modules (e.g., software executing on computer hardware) that handle the events flowing through the contact center. for example, scheduler 170 can include a routing module that handles an item arriving and finding a suitable agent or being queued, and an agent tracking module that measures the agents capacity, availability and work queues they can handle.

For the simulation to be able to handle concurrent communications, it is necessary to track, for any given agent: 1) how many concurrent communications the agent can work on at the same time (max concurrent handling); 2) how many concurrent communications the agent is currently working on (current concurrent handling or percentage attention occupied as described in detail below); 3) if the agent is available to pick up concurrent and/or non-concurrent communications; 4) the queues that the agent can work.

During simulation, a concurrent communication will arrive at a queue based on the categorization of the communication. For example, if the communication relates to technical support, it will be assigned to a technical support queue. An agent to handle the communication is selected from a pool of available agents associated with the queue in the manner described above. The agent can be selected based on two criteria: 1) the agent that is currently engaged in the least number of concurrent interactions; and 2) if none is available, the agent that has been idle for the longest period of time. These criteria can be defined in an algorithm of a routing module of Scheduler 170. These criteria are just an example. The routing algorithm can include any appropriate logic for routing communications in a desired manner.

If no agent satisfies the logic of the routing algorithm, the item is queued, i.e., assigned to an appropriate waiting queue until an agent becomes available to work it (e.g., an existing agent associated with the queue finishes an item, or an agent associated with the queue starts a new shift). An agent is considered not available to take a new item if the agent is either handling a non-concurrent communication or is already at max capacity for concurrent items. The routing of non-concurrent items in the disclosed implementations can be the same as a conventional call center that does not manage concurrent interactions. As one example, in this implementation, the agent that is waiting for the longest time among the idle agents will be picked when a new non-concurrent item arrives (even if this agent is capable of handling concurrent work).

The simulation determines how much work volume the employees perform in the call center. Although scheduled, an agent is not always productive. For example, and agent may take bathroom breaks, encounter computer problems, have a meeting, or the like. This unproductive time, referred to as "shrinkage" herein, can be determined as a percentage of the total time worked by the agent or a group of agents and can be defined, for example, by a supervisor/administrator. Shrinkage can be defined with respect to any group of agents, such as agents assigned to a specific queue, agents on a team, individual agents or communication type. Shrinkage can also be defined for a specific queue (rather than agents assigned to a queue). In this case, an agent assigned to two queues can have two different shrinkage values in each queue.

During conventional simulation, shrinkage is modeled as an increase in the amount of time an agent spends on an item. This works well, but when calculating the Skill Group Weights (SGW), it is desirable to disregard shrinkage, so the shrinkage calculation is reversed. In a conventional environment, this reversal is straightforward to compute. However, when managing concurrent communications, an agent might handle two or more items of different work queues at the same time, each having a different shrinkage value. That is, if an agent worked concurrently on items from multiple queues, it must be determined how much of the time worked by the agent was productive non-shrinkage time.

Figure 6:
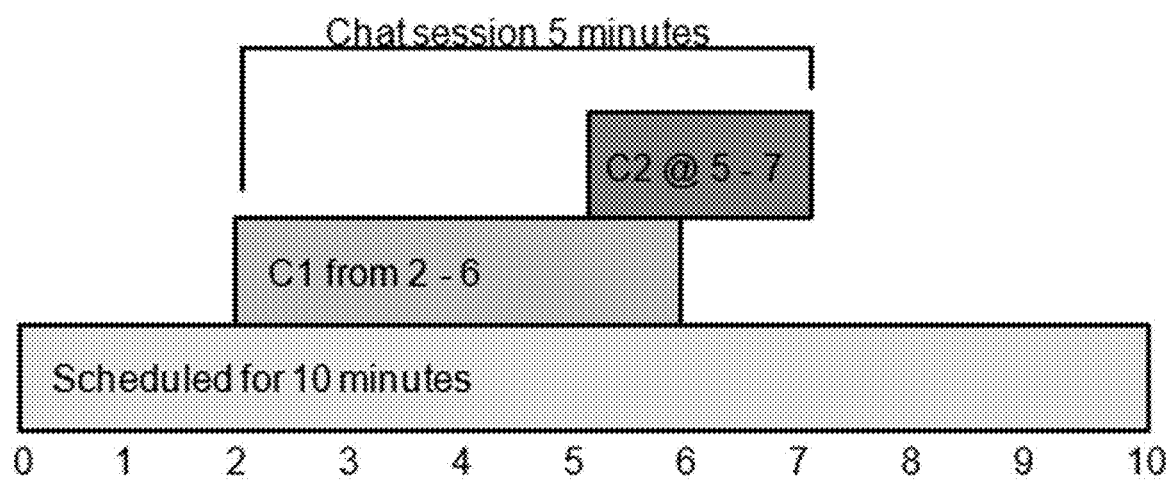
FIG. 6 is a Gantt chart of an example of an agent handling communications in accordance with a disclosed implementation.

To solve this, during simulation, the disclosed implementations calculate a weighted shrinkage based on the time worked in that interval. For example, with reference to FIG. 6, an example with two chat queues, C1 and C2, is illustrated. For this example, assume that C1 and C2 have shrinkage values of 10% and 20%, respectively. Also assume that Agent X has a max concurrent handling of 2 and is scheduled for 10 minutes. If a concurrent communication from C1 is assigned to Agent X at minute 2 and Agent X starts working on it and a concurrent communication from C2 is assigned to Agent X at minute 5, Agent X is now concurrently working on both communications. If the communication from C1 is finished at minute 6 (i.e., it took 4 minutes to be handled) and the communication from C2 is finished at minute 7 (i.e., took 2 minutes to be handled), Agent X works 4 minutes in C1, 2 minutes in C2, and the concurrent session took a total of 5 minutes (from minute 2 to minute 7). The weighted shrinkage on this work will be $(4*0.1+2*0.2)/(4+2)=0.13$. The actual time worked of this agent is then $5*(1-0.13)=4.35$ minutes. Alternatively, as noted above, when routing communications, a concurrent communication can be assumed to take a percentage of the agent's attention, e.g., 20% for some queues and 50% for another. In this case, a communication can only be routed to an agent who is idle or is working on concurrent items and has a percent attention open which is greater than or equal to the percent attention required for the new concurrent communication. In this alternative, the max concurrent items used in the shrinkage calculator is computed as 1/(percent attention requires). For example, a queue that takes 20% of the agent's attention would have a max concurrent of 5.

After simulation, a disclosed implementation computes the initial SGW for a concurrent queue in an interval using the following algorithm:

> The SGW for concurrent queue $C$=(time on queue $C$/time on all concurrent items)*(elapsed concurrent time/non-idle time)

The "elapsed concurrent time" refers to the total physical time that elapsed while handling concurrent items; in contrast, the "time on queue A" and "time on all concurrent items" refer to the total time taken up by concurrent items. Therefore, if two items were being worked on at the same time, they would contribute twice the time to these values.

Figure 7:
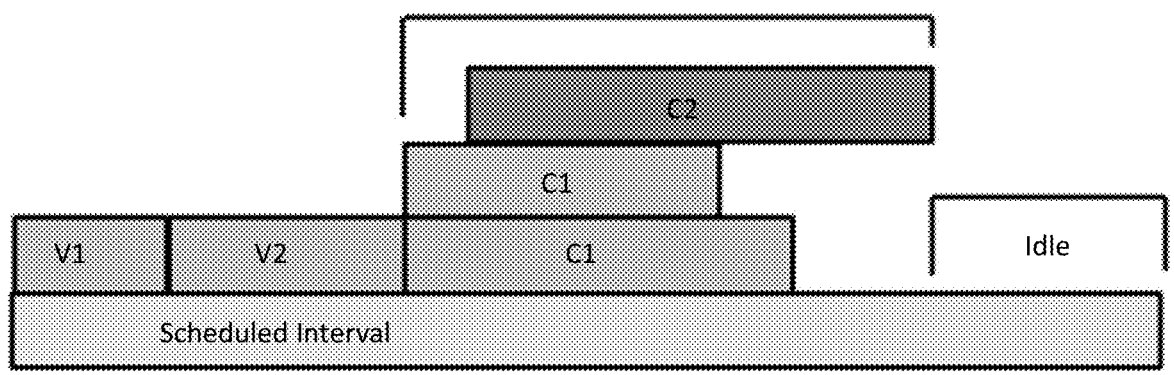
FIG. 7 is a Gantt of another example of an agent handling communications in accordance with a disclosed implementation.

Another example is illustrated in FIG. 7. In this example, Agent X worked on a communication from Voice queue V1 for 2 minutes, then a communication from Voice queue V2 for 3 minutes (both are non-concurrent communications). Then Agent X was assigned a chat communication (an immediate concurrent communication) item from chat queue C1 for 5 minutes and was Immediately assigned a second chat communication from queue C1 for 4 minutes. After working on the communications for queue C1 for 1 minute, Agent X was assigned a social media communication (a deferred concurrent communication) from queue C2 for 6 minutes. Agent X was then idle for the rest of the interval (3 minutes, in this example). Applying the the above algorithm to this example, yields initial SGWs of:

$$(9/15)*(7/12)=0.35 \quad \quad C1$$

$$(6/15)*(7/12)=0.233 \quad \quad C2$$

SGWs can be maintained for deferred concurrent queues but expanded to meet the reverse Erlang formula for immediate concurrent queues. In other words, for deferred concurrent queues, this is the final SGW value. For immediate concurrent queues, this value is expanded to meet the reverse Erlang formula. The difference between concurrent and non-concurrent in this example is that, when removing the single-skilled agents from the Erlang result to get the multi-skilled-Erlang component, that amount removed is increased by their max concurrent handling amount.

When scheduling agents, the SGW for a queue can be applied as the agent's effectiveness, multiplied by that agent's max concurrent handling value. To continue the example above, assume the scheduler schedules Agent X above at 8:00. Agent X's addition to the Staffing FTE for that interval would be $0.233*2=0.466$ for C2. This contribution would be compared to the required staffing for that queue interval (or across several queue intervals in the case of a deferred queue) to compute a service goal score, in the manner described in U.S. application Ser. No. 16/668,525 for example. The contribution of Agent X to C1 would depend on the Erlang expansion, but for the purpose of simplicity, we can assume that there is no expansion needed and the contribution of Agent X to C1 is $0.35*2=0.7$.

Figure 8:
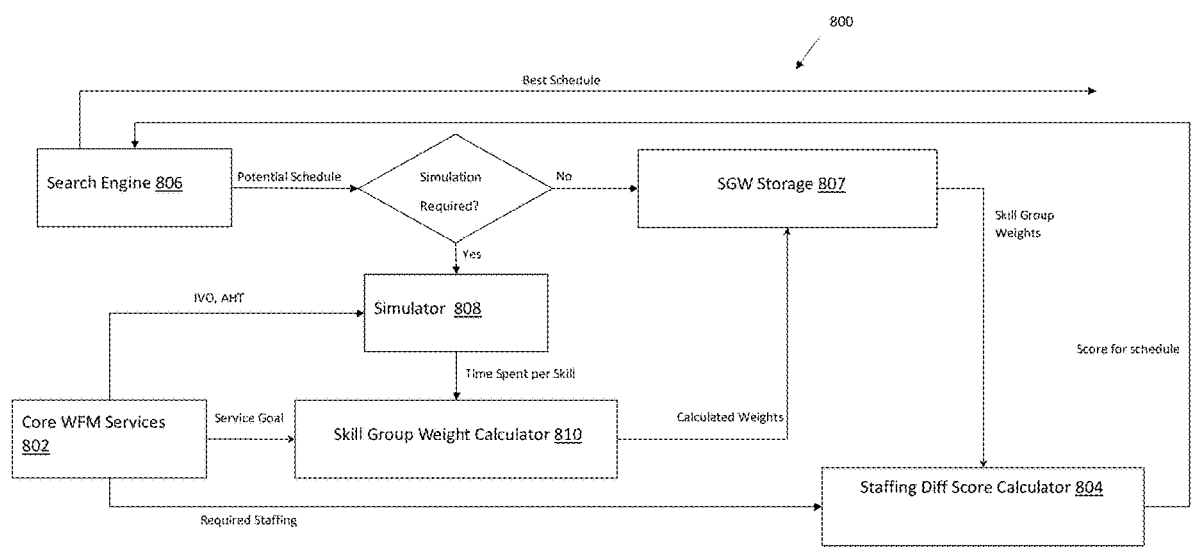
FIG. 8 is a flow chart of logic for creating a staffing schedule, taking into consideration concurrent communications, in accordance with a disclosed implementation

FIG. 8 illustrates the high-level logic flow 800 in accordance with a disclosed implementation. Before scheduling, a user configures Core Work Force Management (WFM) Services with agents, queues, scheduling rules, and any other scheduling information. Core WFM services 802 can be implemented by schedule engine 230 (FIG. 2). Historical call center data, such as call types, call volume and agent handling times (AHT) can be imported. A forecast algorithm of Core WFM services generates a prediction of likely future AHT and call volume. A staffing generator algorithm of Core WFM Services 802 creates staffing requirements for each queue based on that queue's forecasts. The staffing requirements, and any existing schedule are sent to a scheduler module such as scheduler 170 (FIG. 2).

To create a staffing schedule, Staff Differential Score Calculator 804 of the scheduler generates a score for the existing schedule (if any) based on staffing requirements and default/initial SGWs. The schedule score is sent to a search engine algorithm 806 which adjusts the schedule and recomputes the score using the SGWs. If the recomputed score is better, the adjusted schedule is used as the new current schedule. This staffing schedule calculation can be iterated plural times as needed to determine a potential schedule.

If simulation is required, based on a determination such as at 403 of FIG. 4 described above, simulator module 808, such as that described at 405 of FIG. 4 above, is executed based on the latest current schedule. If simulation is not required, the SGWs previously stored in SGW storage module 807 are used. During simulation, as each communication (e.g., call, chat, email, or the like) comes in during simulation, if there is not an agent available to be assigned to the communication, it is queued up until an agent becomes available or the communication is abandoned by the originator of the communication. If there's an agent available for that Queue, the agent takes the communication. If the communication is non-concurrent, that agent becomes unavailable for the duration of that communication. When the communication is completed, the agent becomes available to take a new communication. If the communication is a concurrent communication (e.g., a chat), if the agent has not yet reached their max concurrent items value, the agent can continue to take more concurrent communications, but not non-concurrent communications. Once the agent is concurrently handling as many items as the agent's max concurrent setting, that agent also becomes unavailable to take a new communication.

When any chat communication, or other non-concurrent communication, is completed by an agent who is at max concurrent, that agent becomes available to take new concurrent communications. When all concurrent communications are completed, the agent becomes available to take any communications (concurrent or non-concurrent).

During the simulation, statistics, such as percent service level, time spent on each queue, time spent on each type of communication by each agent, and the like are collected. After the simulation is finished, Skill Group Weight Calculator modules 810 computes new SGWs using the collected statistics (including the time spent working on each queue during the simulation). At this time, the logic can proceed to staffing differential score calculator 804, and search engine 806 again.

The disclosed implementations improve on the prior art by for example, computing SGWs for concurrently handled communications based on distribution of time worked which accounts for idle time and shrinkage and, in the case of immediate queues, expansion. Therefore, the implementations work for immediate (e.g., chat) and deferred (e.g., social media) concurrent communications.

The disclosed implementations can be implemented by various computing devices programmed with software and/or firmware to provide the disclosed functions and modules of executable code implemented by hardware. The software and/or firmware can be stored as executable code on one or more non-transient computer-readable media. The computing devices may be operatively linked via one or more electronic communication links. For example, such electronic communication links may be established, at least in part, via a network such as the Internet and/or other networks.

A given computing device may include one or more processors configured to execute computer program modules. The computer program modules may be configured to enable an expert or user associated with the given computing platform to interface with the system and/or external resources. By way of non-limiting example, the given computing platform may include one or more of a server, a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

While implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A method for scheduling agents in a call center to meet predefined service levels, wherein communications are associated with queues representing categories of communications, the queues including at least one concurrent queue of concurrent communications, wherein multiple concurrent communications can be handled concurrently by a single agent, the method comprising:
  executing a simulation to determine agent effectiveness of plural agents, the simulation including:
  computing a skill group weighting (SGW) for each agent for at least one concurrent queue and at least one interval based on:
    $t_c$, the time spent by the agent on queue C communications
    $t_{all}$, the time spent by the agent on all concurrent communications
    $t_e$, the elapsed concurrent time for the agent
    $t_n$, the non-idle time of the agent; and
  scheduling the agents based on the SGW and max capacity of concurrent communications for each agent.

2. The method of claim 1, wherein the scheduling is based on the SGW multiplied by the max capacity of concurrent communications for each agent.

3. The method of claim 1, wherein shrinkage for each concurrent queue is calculated based on a percentage of total time worked in a queue for each agent.

4. The method of claim 1, wherein shrinkage for each concurrent queue is calculated based on a percentage of attention required in a queue for each agent.

5. The method of claim 1, wherein the scheduling includes calculating a staffing differential based on results of executing the simulation.

6. The method of claim 1 wherein computing a skill group weighting comprises applying the following equation:

$$SGWC=(t_c/t_{all})*(t_e/t_n)$$

7. The method of claim 1 wherein at least one of the queues is an immediate concurrent queue.

8. The method of claim 1 wherein wherein at least one of the queues is a deferred concurrent queue.

9. The method of claim 1, wherein executing a simulation to determine an effectiveness of plural agents further comprises:
   receiving an estimation of the arrival numbers and average handling times of communications associated with each queue for at least one time interval;
   receiving a preliminary schedule of agents including shift intervals and breaks for each agent; and
   receiving a max capacity of concurrent communications for each of the agents.

10. The method of claim 1, wherein shrinkage for each concurrent queue is calculated, the method further comprising;
   routing the communications to agents in accordance with a routing algorithm for each concurrent queue based on communications in the concurrent queue handled by each agent in the concurrent queue; and
   tracking capacity and availability for the agents for each queue.

11. A system for scheduling agents in a call center to meet predefined service levels, wherein communications are associated with queues representing categories of communications, the queues including at least one concurrent queue of concurrent communications, wherein multiple concurrent communications can be handled concurrently by a single agent, the system comprising:
   at least one computer hardware processor; and
   at least one memory device storing instructions which, when executed by the at least one processor, cause the at least one processor to carry out a method of:
      executing a simulation to determine an effectiveness of plural agents, the simulation including:
      computing a skill group weighting (SGW) for each agent for at least one concurrent queue and at least one interval based on:
         $t_c$, the time spent by the agent on queue C communications
         $t_{all}$, the time spent by the agent on all concurrent communications
         $t_e$, the elapsed concurrent time for the agent
         $t_n$, the non-idle time of the agent; and
      scheduling the agents based on the SGW and max capacity of concurrent communications for each agent.

12. The system of claim 11, wherein the scheduling is based on the SGW multiplied by the max capacity of concurrent communications for each agent.

13. The system of claim 11, wherein shrinkage for each concurrent queue is calculated based on a percentage of total time worked in a queue for each agent.

14. The system of claim 11, wherein shrinkage for each concurrent queue is calculated based on a percentage of attention required in a queue for each agent.

15. The system of claim 11, wherein the scheduling includes calculating a staffing differential based on results of executing the simulation.

16. The system of claim 11 wherein computing a skill group weighting comprises applying the following equation:

$$SGWC=(t_c/t_{all})*(t_e/t_n)$$

17. The system of claim 11 wherein at least one of the queues is an immediate queue.

18. The system of claim 11 wherein wherein at least one of the queues is a deferred queue.

19. The system of claim 11, wherein executing a simulation to determine an effectiveness of plural agents further comprises:
   receiving an estimation of the arrival numbers and average handling times of communications associated with each queue for at least one time interval;
   receiving a preliminary schedule of agents including shift intervals and breaks for each agent; and
   receiving a max capacity of concurrent communications for each of the agents.

20. The system of claim 11, wherein shrinkage for each concurrent queue is calculated, the method further comprising;
   routing the communications to agents in accordance with a routing algorithm based on a weighted shrinkage for each concurrent queue based on communications in the concurrent queue handled by each agent in the concurrent queue; and
   tracking capacity and availability for the agents for each queue.

21. Non-transitory computer-readable media having instructions stored thereon which, when executed by a computer processor, cause the computer processor to carry out the method comprising:
   executing a simulation to determine an effectiveness of plural agents, the simulation including:
   computing a skill group weighting (SGW) for each agent for at least one concurrent queue and at least one interval based on:
      $t_c$, the time spent by the agent on queue C communications
      $t_{all}$, the time spent by the agent on all concurrent communications
      $t_e$, the elapsed concurrent time for the agent
      $t_n$, the non-idle time of the agent; and
   scheduling the agents based on the SGW and max capacity of concurrent communications for each agent.

* * * * *